United States Patent
Peng et al.

(10) Patent No.: US 12,471,134 B2
(45) Date of Patent: Nov. 11, 2025

(54) COMMUNICATION METHOD AND APPARATUS FOR IMPROVING TRANSMISSION OF QOS INFORMATION IN COMMUNICATION BETWEEN TERMINALS

(71) Applicant: HUAWEI TECHNOLOGIES CO., LTD., Shenzhen (CN)

(72) Inventors: Wenjie Peng, Shanghai (CN); Yulong Shi, Beijing (CN); Jun Wang, Beijing (CN); Xiangyu Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 440 days.

(21) Appl. No.: 17/975,868

(22) Filed: Oct. 28, 2022

(65) Prior Publication Data
US 2023/0052503 A1  Feb. 16, 2023

Related U.S. Application Data

(63) Continuation of application No. PCT/CN2021/090693, filed on Apr. 28, 2021.

(30) Foreign Application Priority Data

Apr. 30, 2020 (CN) .......................... 202010366591.X

(51) Int. Cl.
*H04W 72/543* (2023.01)
(52) U.S. Cl.
CPC ................. *H04W 72/543* (2023.01)
(58) Field of Classification Search
CPC ................................................. H04W 72/543

USPC .................................................. 370/279, 329
See application file for complete search history.

(56) References Cited

U.S. PATENT DOCUMENTS

| | | | |
|---|---|---|---|
| 2020/0245113 A1* | 7/2020 | Kang | H04W 40/246 |
| 2022/0217575 A1* | 7/2022 | Wang | H04W 28/0268 |
| 2022/0240122 A1* | 7/2022 | Liu | H04W 4/50 |

(Continued)

FOREIGN PATENT DOCUMENTS

| | | |
|---|---|---|
| CN | 108809897 A | 11/2018 |
| CN | 110536262 A | 12/2019 |
| CN | 110602801 A | 12/2019 |

(Continued)

OTHER PUBLICATIONS

3GPP TS 38.331, 3rd Generation Partnership Project; Technical Specification Group Radio Access Network; NR; Radio Resource Control (RRC) Protocol Specification (Release 15), 3GPP Organizational Partners, Mar. 2020, V15.9.0, 536 pages.

*Primary Examiner* — Ricky Q Ngo
(74) *Attorney, Agent, or Firm* — Maier & Maier, PLLC

(57) ABSTRACT

A communication method and an apparatus. The method includes: receiving at least one piece of quality of service QoS information from a second terminal; determining first QoS information based on the at least one piece of QoS information; and determining a first bearer configuration based on the first QoS information, and forwarding data from the second terminal to a third terminal based on the first bearer configuration; or sending the first QoS information to a network device, receiving a first bearer configuration of the network device, and forwarding data from the second terminal to a third terminal based on the first bearer configuration.

15 Claims, 10 Drawing Sheets

(56) References Cited

U.S. PATENT DOCUMENTS

2023/0051269 A1* 2/2023 Liu .................... H04W 24/10

FOREIGN PATENT DOCUMENTS

| | | | | |
|---|---|---|---|---|
| CN | 110831075 A | | 2/2020 | |
| CN | 110838899 A | | 2/2020 | |
| CN | 110944306 A | | 3/2020 | |
| CN | 112351403 A | * | 2/2021 | ........... H04L 43/065 |
| CN | 108781385 B | * | 3/2021 | .......... H04W 72/543 |
| CN | 118890721 A | * | 11/2024 | .......... H04W 88/04 |
| EP | 3836618 A1 | | 6/2021 | |
| EP | 4013180 A1 | | 6/2022 | |
| WO | WO-2018196497 A1 | * | 11/2018 | ............. H04L 29/06 |
| WO | WO-2020030165 A1 | * | 2/2020 | ........ H04W 28/0236 |
| WO | 2020068991 A1 | | 4/2020 | |
| WO | WO-2021190628 A1 | * | 9/2021 | ........... H04L 1/1861 |

\* cited by examiner

COMMUNICATION METHOD AND APPARATUS FOR IMPROVING TRANSMISSION OF QOS INFORMATION IN COMMUNICATION BETWEEN TERMINALS

CROSS-REFERENCE TO RELATED APPLICATIONS

This application is a continuation of International Application No. PCT/CN2021/090693, filed on Apr. 28, 2021, which claims priority to Chinese Patent Application No. 202010366591.X, filed on Apr. 30, 2020. The disclosures of the aforementioned applications are hereby incorporated herein by reference in their entireties.

TECHNICAL FIELD

The embodiments relate to the field of information technologies, a communication method, and an apparatus.

BACKGROUND

In a wireless communication system, data communication between terminals may be performed by using a network, or communication between terminals may be directly performed without using a network device. For example, a typical application scenario in which the communication between terminals is directly performed is the internet of vehicles. In the internet of vehicles, each vehicle is a terminal. Data transmission between the terminals may be performed by using a sidelink (SL) without using a network. In this way, a communication delay can be effectively reduced.

In a current technology, a new radio (NR) SL supports transmission of internet protocol (IP) data and non-IP data. IP data may be used as an example. An IP flow is first processed by a vehicle to everything (V2X) layer and mapped to a quality of service (QoS) flow, and then arrives at an access stratum (AS) of a UE for transmission. In a unicast connection establishment process, two terminals in the unicast connection need to notify peer ends of QoS information of QoS flows obtained through mapping by the two terminals.

However, relaying may be required for the communication between terminals. In this case, a second terminal sends data to a first terminal, and then the first terminal forwards the data to a third terminal. However, because the data sent by the first terminal to the third terminal is not generated by an upper layer of the first terminal, the first terminal cannot obtain corresponding QoS information through mapping. In this case, the first terminal or a network device corresponding to the first terminal cannot learn of QoS information that needs to be ensured when the first terminal sends the data to the third terminal.

SUMMARY

In view of this, the embodiments may provide a communication method and an apparatus, to resolve a problem that a first terminal cannot learn of QoS information that needs to be guaranteed when the first terminal sends data to a third terminal.

According to a first aspect, the embodiments may provide a communication method. The communication method may be applied to a first terminal or a chip of the first terminal. The following uses the first terminal as an execution body for description. In this method, the first terminal receives at least one piece of quality of service QoS information from a second terminal and determines first QoS information based on the at least one piece of QoS information. Subsequently, the first terminal first determines a first bearer configuration based on the first QoS information, then forwards data from the second terminal to a third terminal based on the first bearer configuration. Alternatively, the first terminal sends the first QoS information to a network device, receives a first bearer configuration of the network device, and forwards data from the second terminal to a third terminal based on the first bearer configuration.

By using the communication method provided in the first aspect, the first terminal used as a relay terminal may determine, based on the at least one piece of quality of service information from the second terminal, the first QoS information of communication between the first terminal and the third terminal, so that the first terminal can obtain a sidelink configuration corresponding to the first QoS information.

In a possible implementation, the at least one piece of QoS information includes the first QoS information; or the at least one piece of QoS information includes second QoS information and third QoS information, where the second QoS information is QoS information of communication between the second terminal and the third terminal, and the third QoS information is QoS information of communication between the second terminal and the first terminal.

By using this possible implementation, the first terminal may directly receive the first QoS information indicated by the second terminal, or may determine the first QoS information based on the second QoS information and the third QoS information that are indicated by the second terminal, so that the first terminal can more flexibly learn of the first QoS information of communication between the first terminal and the third terminal.

In a possible implementation, the at least one piece of QoS information is QoS information of a QoS flow to which the data belongs, or the at least one piece of QoS information is QoS information corresponding to a first bearer.

In a possible implementation, the communication method further includes: sending auxiliary information to the second terminal, where the auxiliary information includes a channel busy ratio CBR measurement result and/or QoS information that can be ensured by the first terminal, and the auxiliary information is used to determine the first QoS information.

By using this possible implementation, the first terminal may send the auxiliary information to the second terminal to assist the second terminal in determining the first QoS information, to assist the second terminal in better determining the applicable first QoS information.

In a possible implementation, the communication method further includes: sending an identifier of a second unicast connection to the network device, where there is a correspondence between the second unicast connection and the first QoS information, and the second unicast connection is a unicast connection between the first terminal and the third terminal.

By using this possible implementation, the network device can configure a complete bearer configuration for the second terminal based on the correspondence between the second unicast connection and the first QoS information.

In a possible implementation, the method further includes: reporting a correspondence between a first unicast connection and a second unicast connection to a network device, where the first unicast connection is a unicast connection between a second terminal and the first terminal, and the second unicast connection is a unicast connection between the first terminal and a third terminal.

By using this possible implementation, the network device may learn of a relationship between the two unicast connections of the first terminal, to ensure that a bearer configuration of the first unicast connection matches that of the second unicast connection.

In a possible implementation, the correspondence between the first unicast connection and the second unicast connection includes an identifier of the first unicast connection and an identifier of the second unicast connection.

By using this possible implementation, the first terminal may report the identifiers of the two unicast connections to the network device, so that the network device can quickly learn of the correspondence between the two unicast connections, to ensure that the configuration of the first unicast connection matches the configuration of the second unicast connection.

In a possible implementation, the QoS information includes at least one of the following: a rate, a priority, a packet error rate, and a delay.

According to a second aspect, the embodiments may provide a communication method. The communication method may be applied to a second terminal or a chip of the second terminal. The following uses the second terminal as an execution body for description. In this method, the second terminal first determines at least one piece of QoS information, where the at least one piece of QoS information is used to determine first QoS information, the first QoS information is used to determine a first bearer configuration, and the first bearer configuration is a bearer configuration required when a first terminal forwards data from the second terminal to a third terminal. Then, the second terminal sends the at least one piece of QoS information to the first terminal.

In a possible implementation, the at least one piece of QoS information includes the first QoS information; or the at least one piece of QoS information includes second QoS information and third QoS information.

In a possible implementation, the at least one piece of QoS information is QoS information of a QoS flow to which a data flow belongs or QoS information corresponding to a first bearer.

In a possible implementation, the determining at least one piece of QoS information includes: reporting the second QoS information to a network device, and receiving the first QoS information sent by the network device; or determining the first QoS information based on auxiliary information, where the auxiliary information includes a channel busy ratio CBR measurement result and/or QoS information that can be ensured by the first terminal, and the auxiliary information is preconfigured in the second terminal or is from the first terminal.

In a possible implementation, the QoS information includes at least one of the following: a rate, a priority, a packet error rate, and a delay.

According to a third aspect, the embodiments may provide a communication method. The communication method may be applied to a first terminal or a chip of the first terminal. The following uses the first terminal as an execution body for description. The method includes: The first terminal reports a correspondence between a first unicast connection and a second unicast connection to a network device, where the first unicast connection is a unicast connection between a second terminal and the first terminal, and the second unicast connection is a unicast connection between the first terminal and a third terminal.

By using the communication method provided in the third aspect, the network device may learn of a relationship between the two unicast connections of the first terminal, to ensure that a bearer configuration of the first terminal matches that of the second terminal, and that the bearer configuration of the first terminal matches that of the third terminal.

In a possible implementation, the correspondence between the first unicast connection and the second unicast connection includes an identifier of the first unicast connection and an identifier of the second unicast connection.

By using this possible implementation, the first terminal may report the identifiers of the two unicast connections to the network device, so that the network device can quickly learn of the correspondence between the two unicast connections.

According to a fourth aspect, the embodiments may provide a communication method. The communication method may be applied to a first terminal or a chip of the first terminal. The following uses the first terminal as an execution body for description. The method includes: The first terminal determines that a radio link failure RLF occurs on a second unicast connection, where the second unicast connection is a unicast connection between a third terminal and the first terminal; and the first terminal sends a release request to a second terminal, where the release request requests the second terminal to release a first unicast connection and/or a third unicast connection, the first unicast connection is a unicast connection between the first terminal and the second terminal, and the third unicast connection is a unicast connection between the second terminal and the third terminal.

According to the communication method provided in the fourth aspect, when detecting that the RLF occurs on the second unicast connection, the first terminal may notify the second terminal in time, to quickly release the first unicast connection and/or the third unicast connection corresponding to the second unicast connection, to avoid data loss.

In a possible implementation, the release request includes indication information, and the indication information indicates that an RLF occurs on the first unicast connection.

By using this possible implementation, the second terminal can quickly determine, by using the indication information, the unicast connection on which the RLF occurs.

According to a fifth aspect, the embodiments may provide a communication method. The communication method may be applied to a second terminal or a chip of the second terminal. The following uses the second terminal as an execution body for description. The method includes: The second terminal receives a release request sent by a first terminal, where the release request requests the second terminal to release a first unicast connection and/or a third unicast connection, the first unicast connection is a unicast connection between the first terminal and the second terminal, and the third unicast connection is a unicast connection between the second terminal and a third terminal; and the second terminal releases the first unicast connection and/or the third unicast connection based on the release request, where the release request includes indication information, the indication information indicates that a radio link failure RLF occurs on a second unicast connection, and the second unicast connection is a unicast connection between the third terminal and the first terminal.

According to a sixth aspect, the embodiments may provide a communication method. The communication method may be applied to a first terminal or a chip of the first terminal. The following uses the first terminal as an execution body for description. The method includes: The first terminal determines that a radio link failure RLF occurs on a second unicast connection, where the second unicast connection is a unicast connection between a third terminal and the first terminal; and the first terminal sends indication information to a second terminal, where the indication information indicates that the RLF occurs on the second unicast connection.

According to a seventh aspect, the embodiments may provide a communication method. The communication method may be applied to a second terminal or a chip of the second terminal. The following uses the second terminal as an execution body for description. The method includes: The second terminal receives indication information sent by a first terminal, where the indication information indicates that an RLF occurs on a second unicast connection, and the second unicast connection is a unicast connection between a third terminal and the first terminal; and the second terminal releases a first unicast connection and/or a third unicast connection based on the indication information, where the third unicast connection is a unicast connection between the second terminal and the third terminal, and the first unicast connection is a unicast connection between the second terminal and the first terminal.

According to an eighth aspect, the embodiments may provide a communication apparatus. The apparatus includes: a receiving module, configured to receive at least one piece of QoS information from a second terminal; and a processing module, configured to determine first QoS information based on the at least one piece of QoS information, where the processing module is further configured to: determine a first bearer configuration based on the first QoS information, and forward data from the second terminal to a third terminal based on the first bearer configuration; or the apparatus further includes a sending module, configured to send the first QoS information to a network device, the receiving module is further configured to receive a first bearer configuration of the network device, and the processing module is further configured to forward data from the second terminal to a third terminal based on the first bearer configuration.

In an optional implementation, the at least one piece of QoS information includes the first QoS information; or the at least one piece of QoS information includes second QoS information and third QoS information, where the second QoS information is QoS information of communication between the second terminal and the third terminal, and the third QoS information is QoS information of communication between the second terminal and the communication apparatus.

In an optional implementation, the at least one piece of QoS information is QoS information of a QoS flow to which the data belongs, or the at least one piece of QoS information is QoS information corresponding to a first bearer.

In an optional implementation, the sending module is further configured to send auxiliary information to the second terminal, where the auxiliary information includes a channel busy ratio CBR measurement result and/or QoS information that can be ensured by the communication apparatus, and the auxiliary information is used to determine the first QoS information.

In an optional implementation, the sending module is further configured to send an identifier of a second unicast connection to the network device, where there is a correspondence between the second unicast connection and the first QoS information, and the second unicast connection is a unicast connection between a first terminal and the third terminal.

In an optional implementation, the sending module is further configured to report a correspondence between a first unicast connection and a second unicast connection to the network device, where the first unicast connection is a unicast connection between the second terminal and the communication apparatus, and the second unicast connection is a unicast connection between the first terminal and the third terminal.

In an optional implementation, the correspondence between the first unicast connection and the second unicast connection includes an identifier of the first unicast connection and an identifier of the second unicast connection.

In an optional implementation, the QoS information includes at least one of the following: a rate, a priority, a packet error rate, and a delay.

According to a ninth aspect, the embodiments may provide a communication apparatus. The apparatus includes: a processing module, configured to determine at least one piece of QoS information, where the at least one piece of QoS information is used to determine first QoS information, the first QoS information is used to determine a first bearer configuration, and the first bearer configuration is a bearer configuration required when a first terminal forwards data from the communication apparatus to a third terminal; and a sending module, configured to send the at least one piece of QoS information to the first terminal.

In an optional implementation, the at least one piece of QoS information includes the first QoS information; or the at least one piece of QoS information includes second QoS information and third QoS information.

In an optional implementation, the at least one piece of QoS information is QoS information of a QoS flow to which the data belongs or QoS information corresponding to a first bearer.

In an optional implementation, the sending module is further configured to report the second QoS information to a network device; and the apparatus further includes a receiving module, configured to receive the first QoS information sent by the network device; or the processing module determines the first QoS information based on auxiliary information, where the auxiliary information includes a channel busy ratio CBR measurement result and/or QoS information that can be ensured by the first terminal, and the auxiliary information is preconfigured in the communication apparatus or is from the first terminal.

In an optional implementation, the QoS information includes at least one of the following: a rate, a priority, a packet error rate, and a delay.

According to a tenth aspect, the embodiments may provide a communication apparatus. The apparatus includes a sending module, configured to report a correspondence between a first unicast connection and a second unicast connection to a network device, where the first unicast connection is a unicast connection between a second terminal and the first terminal, and the second unicast connection is a unicast connection between the first terminal and a third terminal.

In a possible implementation, the correspondence between the first unicast connection and the second unicast connection includes an identifier of the first unicast connection and an identifier of the second unicast connection.

According to an eleventh aspect, the embodiments may provide a communication apparatus. The apparatus includes:

a processing module, configured to determine that a radio link failure RLF occurs on a second unicast connection, where the second unicast connection is a unicast connection between a third terminal and a first terminal; and a sending module, configured to send a release request to a second terminal, where the release request requests the second terminal to release a first unicast connection and/or a third unicast connection, the first unicast connection is a unicast connection between the first terminal and the second terminal, and the third unicast connection is a unicast connection between the second terminal and the third terminal.

In a possible implementation, the release request includes indication information, and the indication information indicates that an RLF occurs on the second unicast connection.

According to a twelfth aspect, the embodiments may provide a communication apparatus. The apparatus includes: a receiving module, configured to receive a release request sent by a first terminal, where the release request requests a second terminal to release a first unicast connection and/or a third unicast connection, the first unicast connection is a unicast connection between the first terminal and the second terminal, and the third unicast connection is a unicast connection between the second terminal and a third terminal; and a processing module, configured to release the first unicast connection and/or the third unicast connection based on the release request, where the release request includes indication information, the indication information indicates that a radio link failure RLF occurs on a second unicast connection, and the second unicast connection is a unicast connection between the third terminal and the first terminal.

According to a thirteenth aspect, the embodiments may provide a communication apparatus. The apparatus includes: a processing module, configured to determine that a radio link failure RLF occurs on a second unicast connection, where the second unicast connection is a unicast connection between a third terminal and a first terminal; and a sending module, configured to send indication information to a second terminal, where the indication information indicates that the RLF occurs on the second unicast connection.

According to a fourteenth aspect, the embodiments may provide a communication apparatus. The apparatus includes: a receiving module, configured to receive indication information sent by a first terminal, where the indication information indicates that an RLF occurs on a second unicast connection, and the second unicast connection is a unicast connection between a third terminal and the first terminal; and a processing module, configured to release a third unicast connection and/or a first unicast connection based on the indication information, where the third unicast connection is a unicast connection between a second terminal and the third terminal, and the first unicast connection is a unicast connection between the first terminal and the second terminal.

According to a fifteenth aspect, the embodiments may provide a communication method, applied to a network device, including: receiving second QoS information and third QoS information from a second terminal, and determining first QoS information based on the second QoS information and the third QoS information; receiving first QoS information from a second terminal, determining a first bearer configuration based on the first QoS information, and sending the first bearer configuration to the second terminal; receiving an identifier corresponding to a second unicast connection; or receiving a correspondence between a first unicast connection and a second unicast connection from a first terminal, where the second QoS information is QoS information of communication between the second terminal and a third terminal, the third QoS information is QoS information of communication between the second terminal and the first terminal, the first unicast connection is a unicast connection between the second terminal and the first terminal, and the second unicast connection is a unicast connection between the first terminal and the third terminal.

According to a sixteenth aspect, the embodiments may provide a communication apparatus, including: a receiving module, configured to receive second QoS information and third QoS information from a second terminal; and a processing module, configured to determine first QoS information based on the second QoS information and the third QoS information; a receiving module, configured to receive first QoS information from a second terminal; a processing module, configured to determine a first bearer configuration based on the first QoS information; and a sending module, configured to send the first bearer configuration to the second terminal; a receiving module, configured to receive an identifier corresponding to a second unicast connection; or a receiving module, configured to receive a correspondence between a first unicast connection and a second unicast connection from a first terminal, where the second QoS information is QoS information of communication between the second terminal and a third terminal, the third QoS information is QoS information of communication between the second terminal and the first terminal, the first unicast connection is a unicast connection between the second terminal and the first terminal, and the second unicast connection is a unicast connection between the first terminal and the third terminal.

According to a seventeenth aspect, the embodiments may provide an apparatus, the apparatus may include at least one processor and an interface circuit, and related program instructions are executed in the at least one processor, so that the communication apparatus implements the method according to any one of the first aspect to the seventh aspect.

According to an eighteenth aspect, the embodiments may provide a terminal device, where the terminal device includes a processor, a memory, a transmitter, and a receiver. The transmitter and the receiver are coupled to the processor, the processor controls a sending action of the transmitter, and the processor controls a receiving action of the receiver.

The memory is configured to store computer-executable program code, and the program code includes information. When the processor executes the information, the information enables the terminal device to perform the communication methods provided in the first aspect, the third aspect, the fourth aspect, and the sixth aspect.

According to a nineteenth aspect, the embodiments may provide a terminal device, where the terminal device includes a processor, a memory, a transmitter, and a receiver. The transmitter and the receiver are coupled to the processor, the processor controls a sending action of the transmitter, and the processor controls a receiving action of the receiver.

The memory is configured to store computer-executable program code, and the program code includes information. When the processor executes the information, the information enables the terminal device to perform the communication methods provided in the second aspect, the fifth aspect, and the seventh aspect.

According to a twentieth aspect, the embodiments may provide a chip, including a processor, configured to invoke a computer program from a memory and run the computer program, so that a device in which the chip is installed performs the communication methods provided in the first aspect, the third aspect, the fourth aspect, and the sixth aspect.

According to a twenty-first aspect, the embodiments may provide a chip, including a processor, configured to invoke a computer program from a memory and run the computer program, so that a device in which the chip is installed performs the communication methods provided in the second aspect, the fifth aspect, and the seventh aspect.

According to a twenty-second aspect, the embodiments may provide a non-transitory computer-readable storage medium, configured to store a computer program, where the computer program enables a computer to perform the communication methods provided in the first aspect, the third aspect, the fourth aspect, and the sixth aspect.

According to a twenty-third aspect, the embodiments may provide a non-transitory computer-readable storage medium, configured to store a computer program, where the computer program enables a computer to perform the communication methods provided in the second aspect, the fifth aspect, and the seventh aspect.

According to a twenty-fourth aspect, the embodiments may provide a computer program product, including computer program information, where the computer program information enables a computer to perform the communication methods provided in the first aspect, the third aspect, the fourth aspect, and the sixth aspect.

According to a twenty-fifth aspect, the embodiments may provide a computer program product, including computer program information, where the computer program information enables a computer to perform the communication methods provided in the second aspect, the fifth aspect, and the seventh aspect.

According to a twenty-sixth aspect, the embodiments may provide a computer program, where the computer program enables a computer to perform the communication methods provided in the first aspect, the third aspect, the fourth aspect, and the sixth aspect.

According to a twenty-seventh aspect, the embodiments may provide a computer program, where the computer program enables a computer to perform the communication methods provided in the second aspect, the fifth aspect, and the seventh aspect.

According to the communication method and the apparatus, a first terminal receives at least one piece of quality of service (QoS) information sent by a second terminal and determines first QoS information based on the at least one piece of QoS information. Then, the first terminal determines a first bearer configuration based on the first QoS information, and forwards data from the second terminal to a third terminal based on the first bearer configuration. Alternatively, the first terminal sends the first QoS information to a network device, receives the first bearer configuration of the network device, and forwards data from the second terminal to a third terminal based on the first bearer configuration. In comparison with a current technology, in the communication method, a first terminal used as a relay terminal may determine, based on the received at least one piece of quality of service information, the first QoS information of communication between the first terminal and the third terminal, so that the first terminal can obtain a sidelink configuration corresponding to the first QoS information.

DETAILED DESCRIPTION OF THE EMBODIMENTS

To make the objectives, solutions, and advantages clearer, the following describes the embodiments with reference to the accompanying drawings. The described embodiments are a part rather than all of embodiments. All other embodiments obtained by a person of ordinary skill in the art based on the embodiments without creative efforts shall fall within their scope.

A unicast communication manner may be used for communication between two terminals. The unicast communication is similar to data communication performed after a radio resource control (RRC) connection is established between a terminal and a network device, and a unicast connection needs to be first established between the two terminals. After the unicast connection is established, the two terminals may perform data communication based on a negotiated identifier. The data may be encrypted or may not be encrypted. Compared with the broadcast communication, the unicast communication can be performed only between two terminals that have established the unicast connection.

Figure 1:
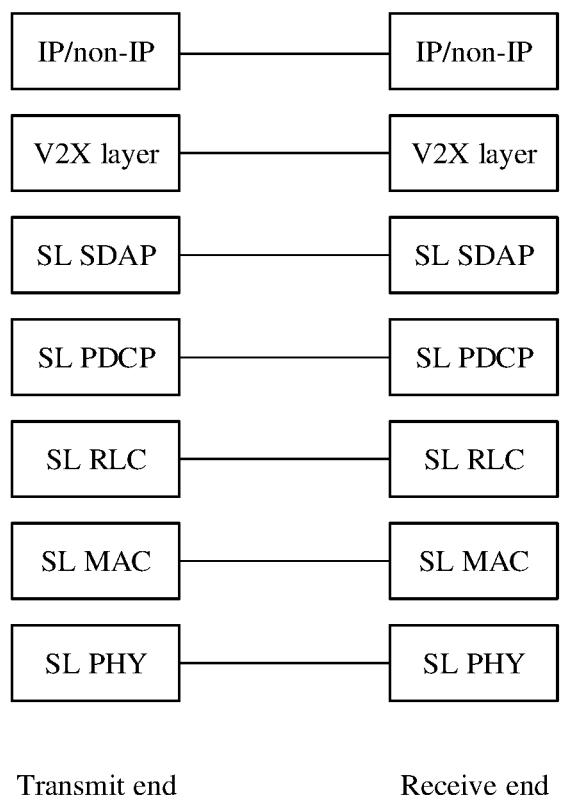
FIG. 1 is a schematic diagram of a user plane protocol stack according to an embodiment.

FIG. 1 is a schematic diagram of a user plane protocol stack according to an embodiment. As shown in FIG. 1, in a unicast connection, composition of a sidelink radio bearer (SLRB) protocol stack may include an SL service data adaptation protocol (SDAP), an SL packet data convergence protocol (PDCP), an SL radio link control (RLC), an SL media access control (MAC), an SL port physical layer (PHY), and the like. Internet protocol (IP) data is used as an example. An IP flow sent by a second terminal is first processed by a V2X layer (a protocol layer), mapped to a quality of service (QoS) flow, and then arrives at an access stratum (AS) of a third terminal. The IP flow is transmitted in an SLRB manner.

A configuration of an SLRB protocol stack may be determined based on QoS information of a QoS flow. The QoS information is generated through mapping at the V2X layer of a transmit end UE and may be a QoS parameter or a QoS profile. The QoS information includes at least one of the following: a maximum flow bit rate, a guaranteed flow bit rate, a packet delay budget, a maximum packet loss rate, a packet error rate, a PC5 interface 5G quality of service identifier (PC5 5QI), a priority, a communication range, an average window (averaging window), and a maximum data burst volume. The IP data is used as an example, the V2X layer can map an IP flow to a QoS flow and obtain corresponding QoS information. In a unicast connection establishment process, the second terminal notifies the third terminal of the QoS information generated through mapping.

Figure 2:
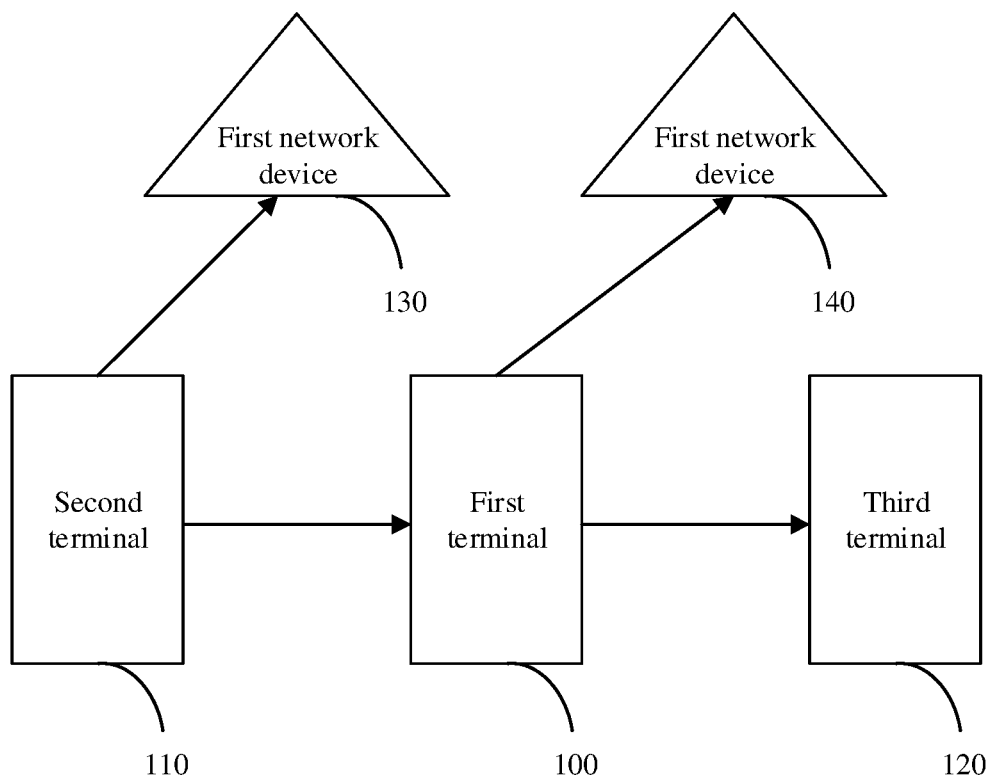
FIG. 2 is a schematic diagram of a scenario of a communication method according to an embodiment.

However, when unicast communication is performed between two terminals, because a distance between the two terminals is long, a status of a link between the two terminals is poor, or the like, the unicast communication needs to be performed by using a relay terminal. FIG. 2 is a schematic diagram of a scenario of a communication method according to an embodiment. As shown in FIG. 2, the scenario includes one or more first terminals 100 on a forwarding side, a second terminal 110 on an initiating side, and a third terminal 120 on a target side. The second terminal 110 and the third terminal 120 have a unicast communication requirement.

When data sent by the second terminal 110 to the third terminal 120 needs to be forwarded by using the first terminal 100, the data needs to pass through two distances: one is between the second terminal 110 and the first terminal 100, and the other is between the first terminal 100 and the third terminal 120. To ensure end-to-end QoS information, the second terminal 110 needs to obtain, from a first network device 130, a bearer configuration used by the second terminal 110 to send data to the first terminal 100, and the first terminal 100 needs to obtain, from a second network device 140, a bearer configuration used by the first terminal 100 to send data to the third terminal 120.

The first terminal 100, the second terminal 110, and the third terminal 120 may alternatively be referred to as user equipment (UE), a mobile station (MS), a mobile terminal (MT), or the like. The terminal may be a mobile phone, a tablet computer (pad), a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in a smart home, or the like.

The first network device 130 and the second network device 140 may be, for example, base stations or various wireless access points, or may be devices that communicate with user equipment over an air interface by using one or more sectors in an access network. The base station may be configured to mutually convert a received over-the-air frame and an IP packet and serve as a router between the wireless terminal and a rest portion of the access network, where the rest portion of the access network may include an internet protocol (IP) network. The base station may coordinate attribute management of the air interface. For example, the base station may be a base transceiver station (BTS) in a global system for mobile communications (GSM) or code division multiple access (CDMA), or may be a NodeB (NB) in wideband code division multiple access (WCDMA), or may be an evolved NodeB (eNB) in long term evolution (LTE), a relay station, an access point, a future 5G network, or the like. This is not limited herein.

Figure 3:
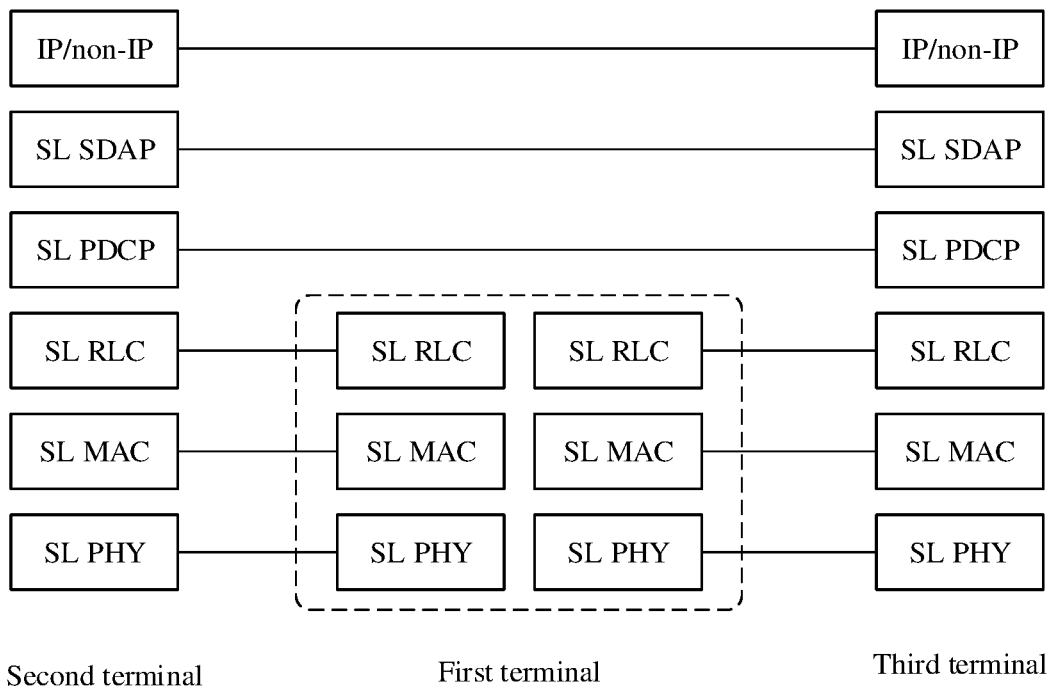
FIG. 3 is a schematic diagram of another user plane protocol stack according to an embodiment.

For end-to-end communication that needs to be relayed in the scenario shown in FIG. 2, a user plane protocol stack of a layer 2 relay (L2 relay) shown in FIG. 3 may be used. FIG. 3 is a schematic diagram of another user plane protocol stack according to an embodiment. As shown in FIG. 3, in an L2 relay architecture, user data may be relayed under a PDCP layer. In addition, in some scenarios, a new layer may be further introduced above an RLC layer, to implement an adaptation or routing function.

However, because the data sent by the first terminal 100 to the third terminal 120 is not generated by an upper layer of the first terminal 100, the first terminal 100 cannot obtain corresponding QoS information through mapping. Therefore, when performing relaying, the first terminal 100 cannot learn of QoS information that needs to be ensured when the first terminal 100 sends data to the third terminal 120.

To solve the foregoing problem, the embodiments may provide a communication method and an apparatus, so that the first terminal learns of first QoS information when the first terminal sends data to the third terminal. A second terminal may actively provide the first QoS information for the first terminal, so that the first terminal can complete bearer configuration based on the first QoS information, and send, to the third terminal based on the bearer configuration, data forwarded from the second terminal.

In the L2 relay architecture, the second terminal may actively provide the first QoS information for the first terminal in the following several manners.

Manner 1: After determining at least one piece of QoS information, the second terminal sends the at least one piece of QoS information to the first terminal, and the first terminal determines first QoS information based on the at least one piece of QoS information. Then, the first terminal determines a first bearer configuration based on the first QoS information, and the first terminal forwards data from the second terminal to the third terminal based on the first bearer configuration.

Manner 2: After determining at least one piece of QoS information, the second terminal sends the at least one piece of QoS information to the first terminal, and the first terminal determines first QoS information based on the at least one piece of QoS information. The first terminal sends the first QoS information to a network device, and the network device determines a first bearer configuration of the network device based on the first QoS information. The first terminal receives the first bearer configuration of the network device, and forwards data from the second terminal to a third terminal based on the first bearer configuration.

Manner 3: After determining at least one piece of QoS information, the second terminal sends the at least one piece of QoS information to the first terminal. The first terminal device directly sends the at least one piece of QoS information to a network device, and the network device determines first QoS information based on the at least one piece of QoS information, and further determines a first bearer configuration of the network device. Then, the first terminal receives the first bearer configuration of the network device, and forwards data from the second terminal to a third terminal based on the first bearer configuration.

The following several embodiments may be combined with each other, and same or similar concepts or processes may not be described in detail in some embodiments.

Figure 4:
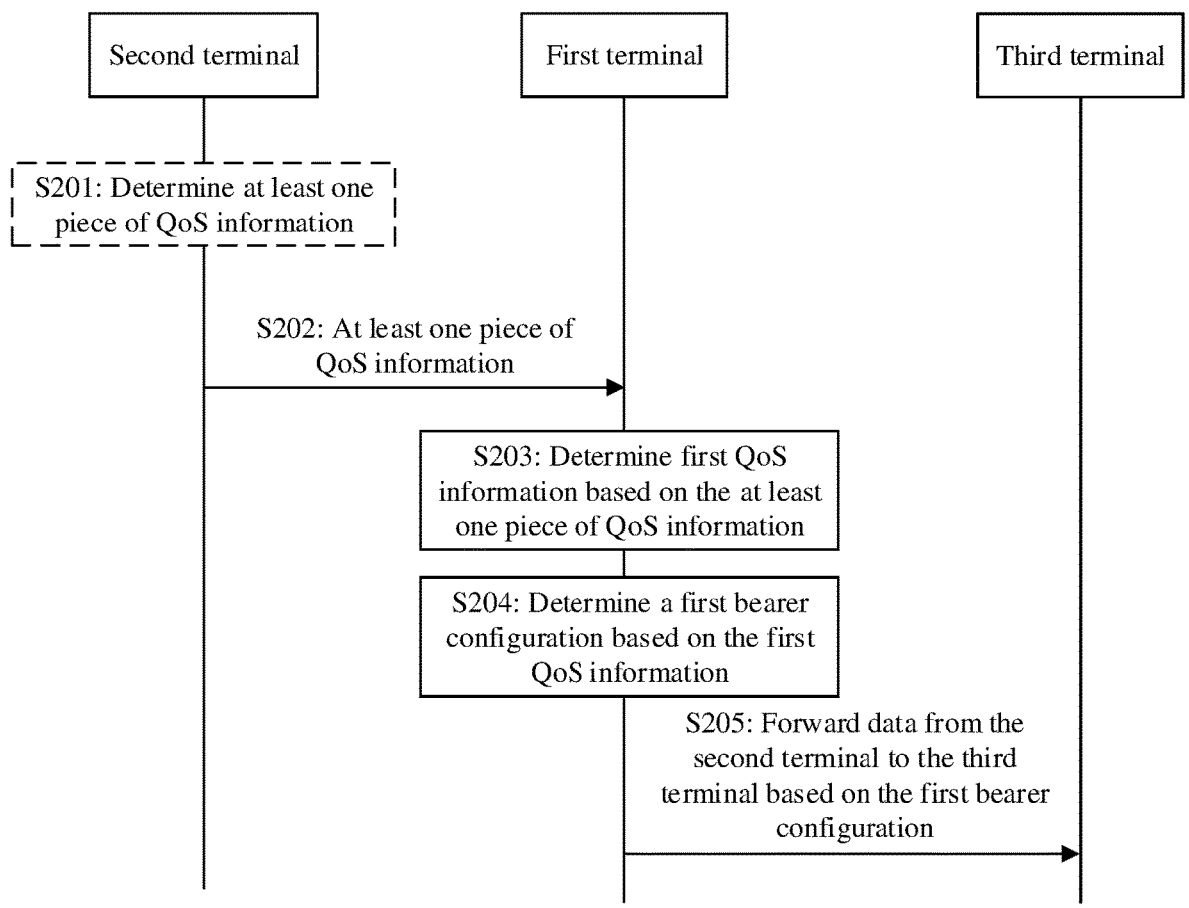
FIG. 4 is a signaling exchange diagram of a communication method according to an embodiment.

FIG. 4 is a signaling exchange diagram of a communication method according to an embodiment. This embodiment relates to a process in which the first terminal learns of the first QoS information in the manner 1 when forwarding the data from the second terminal to the third terminal. As shown in FIG. 4, the method includes the following steps.

S201: The second terminal determines at least one piece of QoS information, where the at least one piece of QoS information is used to determine first QoS information, the first QoS information is used to determine a first bearer configuration, and the first bearer configuration is a bearer configuration required when the first terminal forwards the data from the second terminal to the third terminal.

The at least one piece of QoS information may be QoS information of a QoS flow to which the data sent by the second terminal to the third terminal belongs, or the at least one piece of QoS information may be QoS information corresponding to a first bearer used by the first terminal to forward the data from the second terminal to the third terminal.

The at least one piece of QoS information may include the first QoS information; or the at least one piece of QoS information may include second QoS information and third QoS information. The first QoS information is QoS information of communication between the first terminal and the third terminal, the second QoS information is QoS information of communication between the second terminal and the third terminal, and the third QoS information is QoS information of communication between the second terminal and the first terminal.

It should be understood that the communication between the second terminal and the third terminal may be a process in which the data sent by the second terminal is forwarded by the first terminal and finally arrives at the third terminal. Correspondingly, the second QoS information may be QoS that needs to be met for data transmission in the communication between the second terminal and the third terminal.

For example, the second terminal sends IP data to the third terminal by using the first terminal. The IP data is generated on the second terminal, and a destination is the third terminal. Therefore, the second terminal may obtain the second QoS information through mapping based on IP information such as a source IP address, a destination IP address, a source port number, and a destination port number of the IP data, or a service type, and further determine the third QoS information. Alternatively, the second QoS information and the third QoS information may be directly indicated by a network device.

In some embodiments, the second terminal may directly use the second QoS information and the third QoS information as the at least one piece of QoS information. In some other embodiments, the second terminal may further determine the first QoS information based on the second QoS information and the third QoS information and use the first QoS information as the at least one piece of QoS information.

How to determine the first QoS information is not limited in this embodiment. The first QoS information may be determined by the second terminal or may be determined by a network device serving the second terminal.

For example, if the second terminal is in a connected mode, the second terminal may report the second QoS information to the network device, and after determining the first QoS information based on the second QoS information, the network device sends the first QoS information to the first terminal. The second terminal may report the second QoS information and identification information of a corresponding QoS flow. After determining the first QoS information, the network device sends the first QoS information and the identification information of the corresponding QoS flow to the second terminal.

Similarly, the third QoS information may be determined by the network device serving the second terminal. A process of determining the third QoS information is similar to that of determining the first QoS information, and details are not described herein again.

For example, if the second terminal is in an idle mode (idle) or an inactive mode (inactive), the second terminal may determine the first QoS information based on a channel busy ratio (CBR) measurement result and/or auxiliary information. The measurement result and/or the auxiliary information may be preconfigured or may be measured by the first terminal and then sent to the second terminal or may be broadcast by the network device. For example, the network device broadcasts QoS information that can be ensured by the terminal device within coverage of a current cell. Optionally, the QoS information that can be ensured has a correspondence with the CBR measurement result.

S202: The second terminal sends the at least one piece of QoS information to the first terminal.

In this embodiment, when the second terminal sends the at least one piece of QoS information to the first terminal is not limited. In some embodiments, the second terminal sends the at least one piece of QoS information to the first terminal after the second terminal establishes a unicast connection to the first terminal. In some other embodiments, the second terminal sends the at least one piece of QoS information to the first terminal during the process in which the second terminal establishes a unicast connection to the first terminal.

S203: The first terminal determines the first QoS information based on the at least one piece of QoS information.

The first terminal may determine the first QoS information based on the at least one piece of QoS information after receiving the at least one piece of QoS information sent by the second terminal. In some embodiments, if the at least one piece of QoS information includes the first QoS information, the first terminal may directly determine the first QoS information. In some other embodiments, if the at least one piece of QoS information includes the second QoS information and the third QoS information, the first terminal may determine the first QoS information based on the second QoS information, the third QoS information, and a type of the QoS information.

For example, information such as a rate, a priority, and a packet error rate in the first QoS information may be directly consistent with information of same types in the second QoS information and the third QoS information. A delay in the first QoS information may be equal to a difference between delays in the second QoS information and the third QoS information or may be less than a difference between delays in the second QoS information and the third QoS information.

S204: The first terminal determines the first bearer configuration based on the first QoS information.

After determining the first QoS information, if the first terminal is in an idle mode (idle) or an inactive mode (inactive), the first terminal may determine the first bearer configuration based on the first QoS information.

The first bearer configuration is a bearer configuration used by the first terminal to forward the data (service data or signaling) from the second terminal to the third terminal. The bearer configuration may include an SL bearer configuration and an SL-related physical layer configuration.

How to determine the first bearer configuration based on the first QoS information is not limited in this embodiment. In some embodiments, the first terminal may preset preconfiguration information, where the preconfiguration information includes a correspondence between QoS information and a bearer configuration, and the first terminal may determine the corresponding first bearer configuration in the preconfiguration information based on the first QoS information. In some other embodiments, the network device broadcasts a correspondence between QoS information and a bearer configuration, and the first terminal may determine, based on the first QoS information and the correspondence between the QoS information and the bearer configuration, the first bearer configuration corresponding to the first QoS information.

S205: The first terminal forwards the data from the second terminal to the third terminal based on the first bearer configuration.

Figure 5:
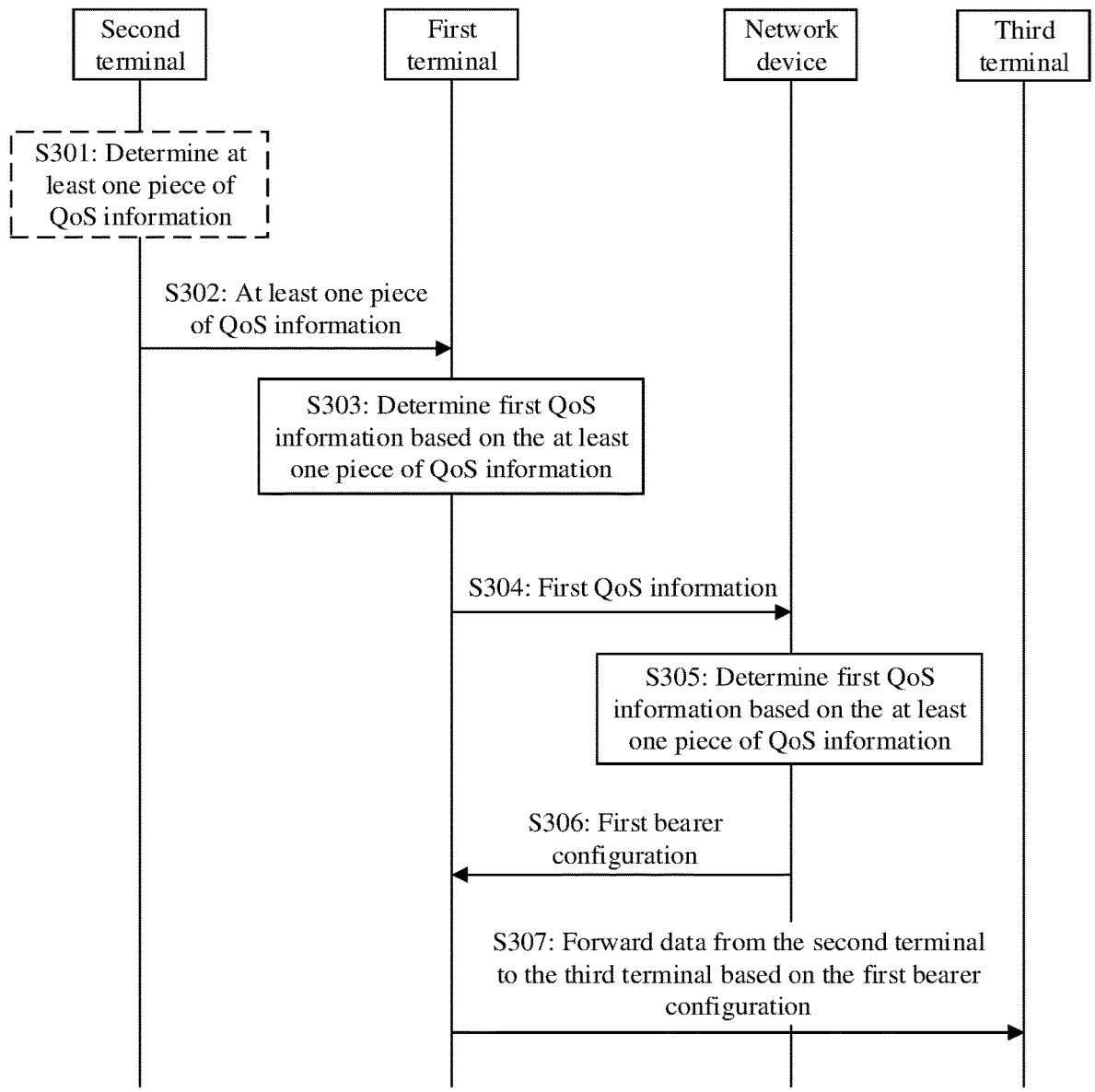
FIG. 5 is a signaling exchange diagram of another communication method according to an embodiment.

FIG. 5 is a signaling exchange diagram of another communication method according to an embodiment. This embodiment relates to a process in which the first terminal learns of the first QoS information in the manner 2 when forwarding the data from the second terminal to the third terminal. As shown in FIG. 5, the method includes the following steps.

S301: The second terminal determines at least one piece of QoS information.

S302: The second terminal sends the at least one piece of QoS information to the first terminal.

S303: The first terminal determines the first QoS information based on the at least one piece of QoS information.

For understanding of terms, effects, features, and optional implementations of S301 to S303, refer to S201 to S203 shown in FIG. 4. Repeated content is not described herein again.

S304: The first terminal sends the first QoS information to a network device.

S305: The network device determines a first bearer configuration based on the first QoS information.

S306: The first terminal receives the first bearer configuration of the network device.

In step S304 and step S305, after determining the first QoS information, the first terminal may send the first QoS information to the network device (if the first terminal is in an RRC connected mode (RRC connected)) and request the first bearer configuration from the network device. The network device determines the first bearer configuration based on the first QoS information and sends the first bearer configuration to the first terminal.

How the network device determines the first bearer configuration is not limited in this embodiment. In an optional implementation, the network device may determine, based on a preset correspondence between QoS information and a bearer configuration, the first bearer configuration corresponding to the first QoS information. In some other embodiments, the network device may determine, based on a measurement result (for example, a CBR measurement result) sent by the first terminal and/or QoS information that can be ensured by the first terminal, the first bearer configuration corresponding to the first QoS information.

In some optional implementations, the first terminal may further send an identifier of a second unicast connection to the network device. Because there is a correspondence between the second unicast connection and the first QoS information, after receiving an identifier corresponding to a unicast connection between the first terminal and the third terminal, the network device may determine a unicast connection corresponding to the first QoS information, to better balance the bearer configuration.

S307: The first terminal forwards the data from the second terminal to the third terminal based on the first bearer configuration.

Figure 6:
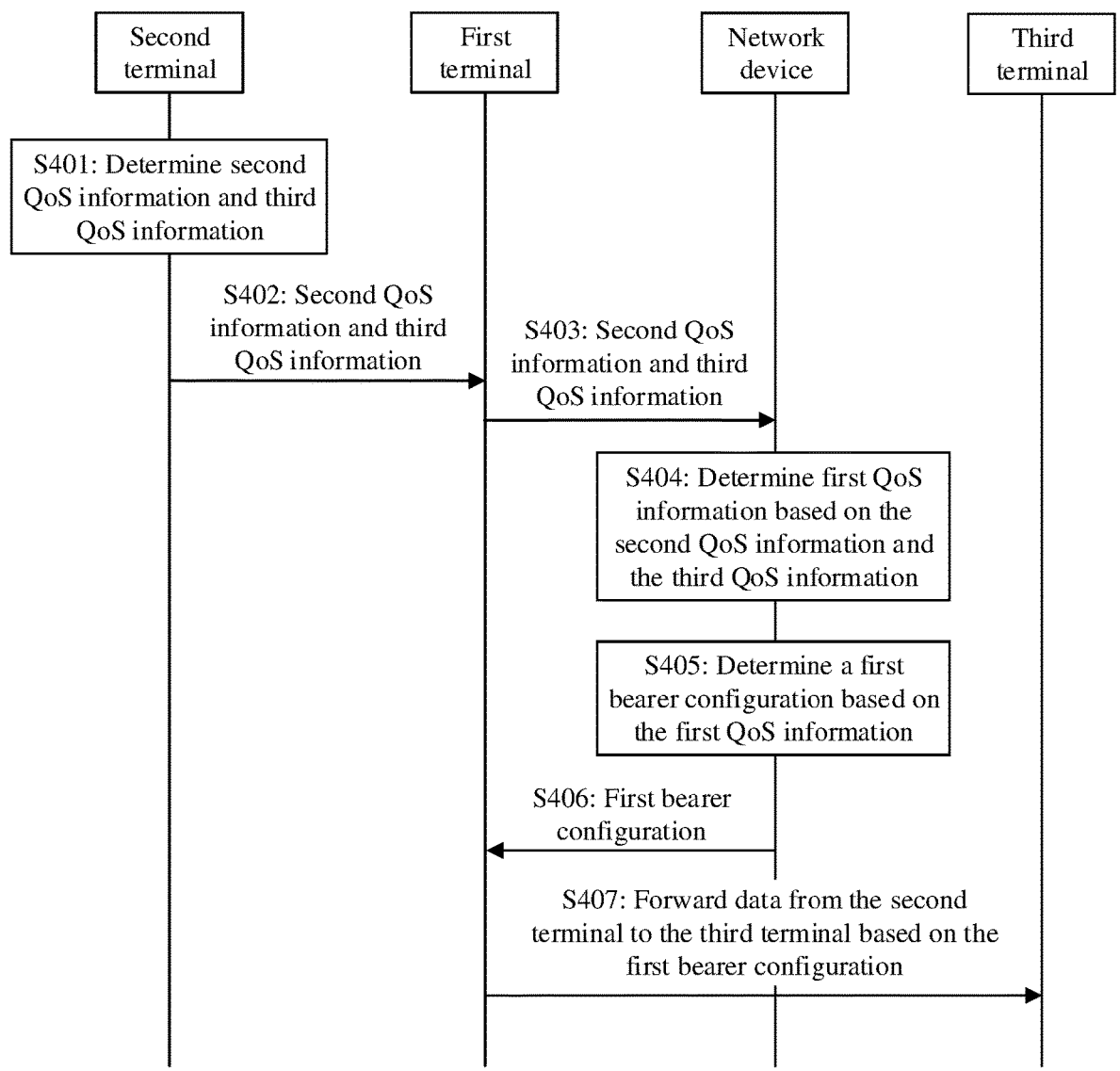
FIG. 6 is a signaling exchange diagram of still another communication method according to an embodiment.

FIG. 6 is a signaling exchange diagram of still another communication method according to an embodiment. This embodiment relates to a process in which the first terminal learns of the first QoS information in the manner 3 when forwarding the data from the second terminal to the third terminal. As shown in FIG. 6, the method includes the following steps.

S401: The second terminal determines second QoS information and third QoS information.

S402: The second terminal sends the second QoS information and the third QoS information to the first terminal.

For understanding of terms, effects, features, and optional implementations of S401 and S402, refer to S201 and S202 shown in FIG. 4. Repeated content is not described herein again.

S403: The first terminal sends the second QoS information and the third QoS information to a network device.

S404: The network device determines the first QoS information based on the second QoS information and the third QoS information.

S405: The network device determines a first bearer configuration based on the first QoS information.

S406: The first terminal receives the first bearer configuration of the network device.

In step S403 to step S406, after receiving the second QoS information and the third QoS information, the first terminal may send the second QoS information and the third QoS information to the network device, and the network device determines the first QoS information based on the second QoS information and the third QoS information. Then, the network device further determines the first bearer configuration based on the first QoS information and sends the first bearer configuration to the first terminal.

How to determine the first QoS information based on the second QoS information and the third QoS information is similar to step S203 in FIG. 4, and details are not described herein again. How to determine the first bearer configuration based on the first QoS information is similar to step S305 in FIG. 5, and details are not described herein again.

In some embodiments, after determining the first QoS information, in addition to sending the first bearer configuration to the first terminal, the network device may further send the first QoS information. Further, after receiving the first QoS information, the first terminal may further send the first QoS information to the third terminal.

S407: The first terminal forwards the data from the second terminal to the third terminal based on the first bearer configuration.

The following several embodiments may be combined with each other, and same or similar concepts or processes may not be described in detail in some embodiments.

According to the communication method, the first terminal receives the at least one piece of quality of service QoS information from the second terminal and determines the first QoS information based on the at least one piece of QoS information. Then, the first terminal determines the first bearer configuration based on the first QoS information and forwards the data from the second terminal to the third terminal based on the first bearer configuration. Alternatively, the first terminal sends the first QoS information to the network device, receives the first bearer configuration of the network device, and forwards the data from the second terminal to the third terminal based on the first bearer configuration. In comparison with a current technology, in the communication method, a first terminal used as a relay terminal may determine, based on the received at least one piece of quality of service information, the first QoS information of communication between the first terminal and the third terminal, so that the first terminal can obtain a sidelink configuration corresponding to the first QoS information.

To enable the second terminal to determine the first QoS information more accurately, the first terminal may further measure an SL. For example, the measurement includes at least one of the following: channel busy ratio (CBR) measurement, reference signal received power (RSRP) measurement, and channel quality indicator (CQI) measurement. Then, the first terminal may send, to the second terminal, a measurement result and QoS information that can be ensured by the first terminal, to assist the second terminal in determining the first QoS information.

Figure 7:
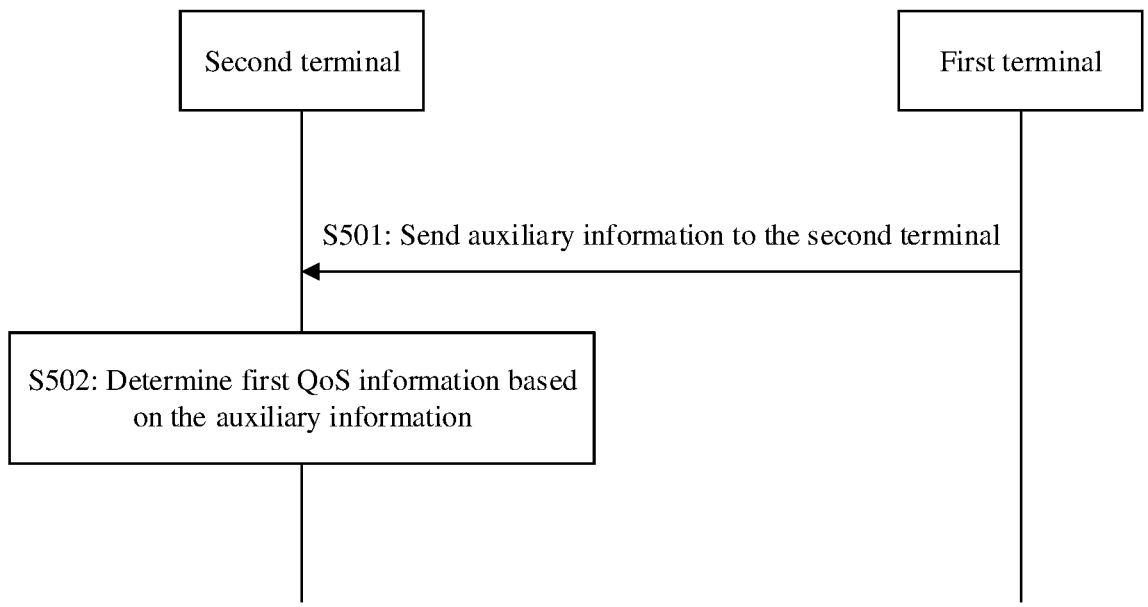
FIG. 7 is a signaling exchange diagram of yet another communication method according to an embodiment.

The following uses the CBR measurement as an example to describe how to assist in determining the first QoS information. FIG. 7 is a signaling exchange diagram of yet another communication method according to an embodiment. As shown in FIG. 7, the communication method further includes the following steps.

S501: A first terminal sends auxiliary information to a second terminal, where the auxiliary information includes a measurement result and/or QoS information that can be ensured by the first terminal.

The measurement result may be a CBR, and the CBR may be used to evaluate a status of a sidelink between two terminals. The first terminal may perform CBR measurement on a resource pool used by the first terminal to send data to the third terminal, to obtain a CBR measurement result between the first terminal and the third terminal. In addition, the second terminal may further actively determine the QoS information that can be ensured by the first terminal.

In an optional implementation, the first terminal may send the auxiliary information to the second terminal by using an SL RRC message of a unicast connection.

The operation S501 is an optional step. The auxiliary information may alternatively be preconfigured in the first terminal.

S502: The second terminal determines first QoS information based on the auxiliary information.

After receiving the auxiliary information sent by the first terminal, the second terminal may allocate the QoS information based on the auxiliary information, to determine the first QoS information.

How to determine the first QoS information based on the auxiliary information is not limited in this embodiment. In some embodiments, if the auxiliary information is the CBR measurement result, the second terminal may determine corresponding QoS information based on a correspondence between the CBR measurement result and the QoS information. In some other embodiments, if the auxiliary information is the QoS information that can be ensured by the first terminal, the QoS information that can be ensured by the first terminal may be used as a limit value of the first QoS information. When the first QoS information is determined, a value within the QoS information that can be ensured by the first terminal may be used.

In an optional implementation, the auxiliary information may further be measured in advance and preconfigured in the second terminal.

In addition, in the embodiment shown in FIG. 6, if the first QoS information is determined by the network device, correspondingly, when sending the second QoS information to the network device, the first terminal may also send the auxiliary information to the network device, and the network device uses the auxiliary information to assist in determining the first QoS information.

In the communication method provided in this embodiment, the first terminal sends the auxiliary information to the second terminal, where the auxiliary information includes the CBR measurement result and/or the QoS information that can be ensured by the first terminal. Then, the second terminal determines the first QoS information based on the auxiliary information. Because the CBR measurement result and/or the QoS information that can be ensured by the first terminal are/is referenced when the first QoS information is determined, the determined first QoS information is more accurate.

As shown in the user plane protocol stack shown in FIG. 3, the first terminal serves as a transit node to perform mapping and relaying for a bearer between the second terminal and the third terminal. If the first terminal is in a connected mode, the first terminal reports unicast connection information between the first terminal and the second terminal or unicast connection information between the first terminal and the third terminal to the network device, and the network device respectively provides corresponding bearer configurations for the two unicast connections. However, if the network device respectively provides the bearer configurations for the two unicast connections, the bearer configurations of the two unicast connections may not match due to reasons such as inconsistent bearer quantities. Consequently, a bearer between the second terminal and the third terminal cannot be established, and the first terminal used as a relay terminal cannot work.

Figure 8:
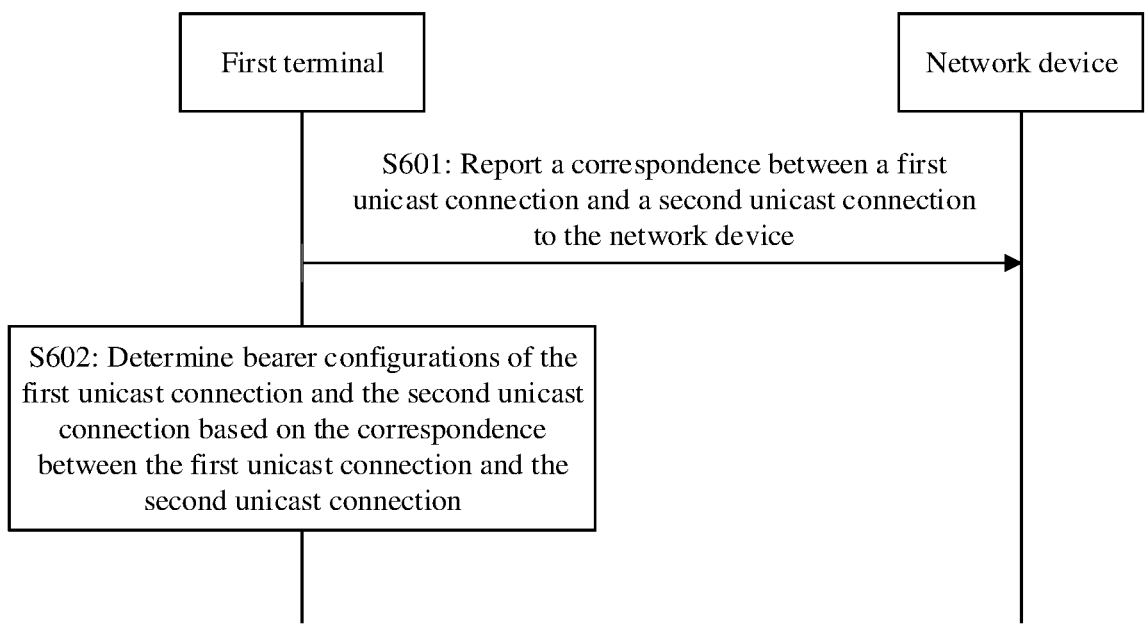
FIG. 8 is a signaling exchange diagram of yet another communication method according to an embodiment.
Figure 9:
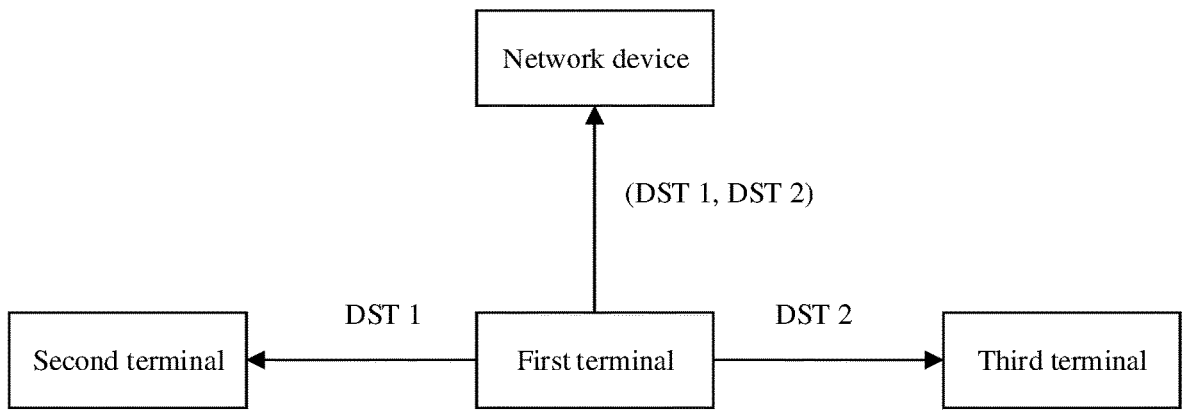
FIG. 9 is a schematic diagram of reporting a correspondence between unicast connections according to an embodiment.

To resolve the foregoing problem, the embodiments may provide a communication method shown in FIG. 8. FIG. 8 is a signaling exchange diagram of yet another communication method according to an embodiment. FIG. 8 relates to a process of how a first terminal reports a correspondence between two unicast connections to a network device. FIG. 9 is a schematic diagram of reporting a correspondence between unicast connections according to an embodiment. As shown in FIG. 8, the communication method includes the following steps.

S601: The first terminal reports a correspondence between a first unicast connection and a second unicast connection to the network device.

It should be understood that the first unicast connection is a unicast connection between a second terminal and the first terminal, and the second unicast connection is a unicast connection between the first terminal and a third terminal.

In some embodiments, the correspondence between the first unicast connection and the second unicast connection includes an identifier of the first unicast connection and an identifier of the second unicast connection. For example, as shown in FIG. 9, the first terminal sends data from the third terminal to the second terminal by using a first destination identifier (destination, DST) 1. Optionally, the DST 1 is a destination identifier of the second terminal device. The DST 1 may be allocated by the first terminal for the second terminal device. The first terminal sends data from the second terminal to the third terminal by using a second destination identifier DST 2. Optionally, the DST 2 is a destination identifier of the third terminal device. The DST 2 may be allocated by the first terminal for the third terminal. Therefore, the DST 1 may be used to indicate the first unicast connection, and the DST 2 may be used to indicate the second unicast connection. The identifier of the first unicast connection is a destination identifier of the first unicast connection, and the identifier of the second unicast connection is a destination identifier of the second unicast connection. Based on this, the first terminal may simultaneously send the DST 1 and the DST 2 to the network device to report the correspondence between the first unicast connection and the second unicast connection.

Optionally, the first terminal may also use both a source identifier and a destination identifier of a unicast connection as identifiers of the unicast connection. Optionally, the source identifier is an identifier allocated by the first terminal for the unicast connection. In this case, identifiers of the first unicast connection are a source identifier and a destination identifier of the first unicast connection, and identifiers of the second unicast connection are a source identifier and a destination identifier of the second unicast connection.

In addition, in some embodiments, in addition to reporting the correspondence between the first unicast connection and the second unicast connection to the network device, the first terminal may further report an identifier of a unicast connection corresponding to QoS information to the network device when reporting the QoS information. For example, when reporting the first QoS information, the first terminal may report an identifier of a second unicast connection to the network device at the same time. There is a correspondence between the second unicast connection and the first QoS information.

For example, if the second terminal sends data to the third terminal through forwarding by the first terminal, the first terminal may report, to the network device, QoS information received from the second terminal and a first unicast connection corresponding to the QoS information. If the third terminal sends data to the first terminal through forwarding by the first terminal, the first terminal may report, to the network device, QoS information received from the third terminal and a second unicast connection corresponding to the QoS information.

When receiving QoS information, the network device may learn of a unicast connection corresponding to the QoS information and may determine another unicast connection in correspondence with the unicast connection. Therefore, when a configuration parameter is determined based on the QoS information, it can be ensured that bearer configurations of unicast connections on two sides of the first terminal match.

S602: The network device determines a bearer configuration of the second unicast connection based on the correspondence between the first unicast connection and the second unicast connection.

When the first terminal sends data from the second terminal to the third terminal, the network device may configure the bearer configuration of the second unicast connection for the first terminal after receiving the correspondence between the first unicast connection and the second unicast connection. When the bearer configuration of the second unicast connection is determined, it needs to be ensured that a bearer configuration of the first unicast connection matches that of the second unicast connection. For example, a quantity of bearer configurations is used as an example, the network device needs to ensure that a quantity of bearer configurations of the first unicast connection is consistent with a quantity of bearer configurations of the second unicast connection.

It should be noted that, the unicast connection established between the second terminal and the third terminal through the first terminal may also have a requirement for the first terminal to forward data from the third terminal to the second terminal. In this case, how the network device determines the bearer configuration of the first unicast connection is consistent with an operation of sending the data from the second terminal to the third terminal by the first terminal in the foregoing embodiment, and details are not described herein again. In addition, data sent in two directions may be processed by the first terminal in parallel. For example, after receiving the data of the second terminal, the first terminal may forward the data to the third terminal while receiving the data from the third terminal. When the first terminal sends a message to the network device, QoS information of the first unicast connection and QoS information of the second unicast connection may also be reported in parallel, and details are not described herein again.

According to the communication method provided in this embodiment, the first terminal reports the correspondence between the first unicast connection and the second unicast connection to the network device, and the network device determines the bearer configuration of the second unicast connection based on the correspondence between the first unicast connection and the second unicast connection. In comparison with a current technology, the first terminal may report the identifiers of the two unicast connections to the network device, so that the network device can quickly learn of the correspondence between the two unicast connections, to ensure that the configuration of the first unicast connection matches the configuration of the second unicast connection.

The following describes, in combination with the user protocol stack shown in FIG. 3, how to provide the bearer configuration for the second terminal. In the user protocol stack shown in FIG. 3, the first unicast connection may correspond to RLC, MAC, and PHY configurations. A third unicast connection may correspond to SDAP and PDCP configurations. When the second terminal sends, to the third terminal, data forwarded by the first terminal, not only the first unicast connection is used, but also the third unicast connection is used. If the second terminal reports only the first unicast connection to the network device, the network device cannot determine the third unicast connection corresponding to the first unicast connection. Therefore, only the bearer configuration corresponding to the first unicast connection is provided for the second terminal, and the SDAP and PDCP configurations corresponding to the third unicast connection cannot be provided for the second terminal. Consequently, the bearer configuration provided for the second terminal is incomplete.

Figure 10:
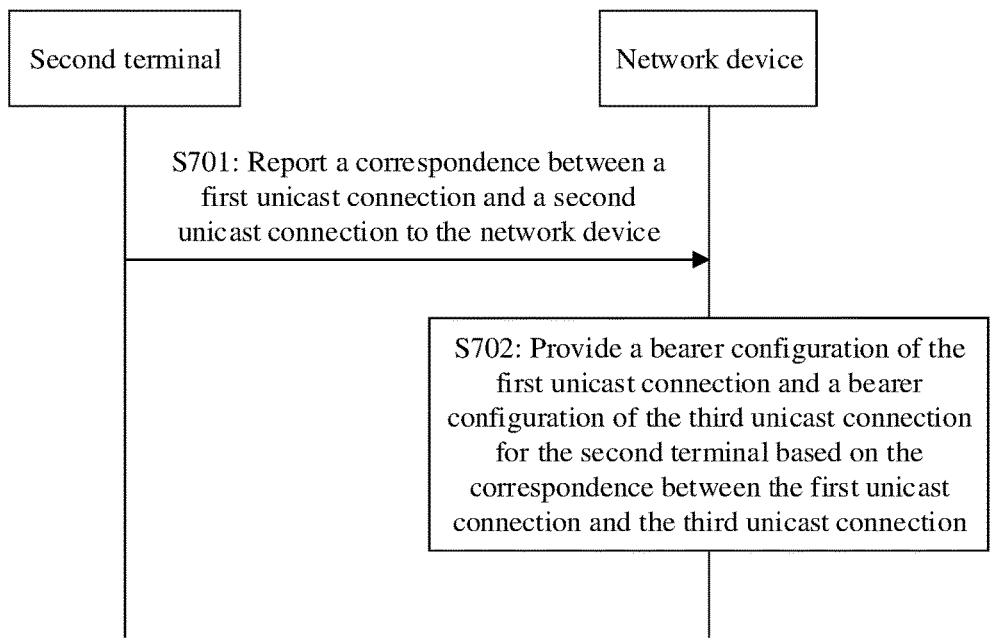
FIG. 10 is a signaling exchange diagram of yet another communication method according to an embodiment.

To resolve the foregoing problem, the embodiments may provide a communication method shown in FIG. 10. A correspondence between the first unicast connection and the third unicast connection is reported to the network device, to ensure that the network device provides a complete bearer configuration for the second terminal. FIG. 10 is a signaling exchange diagram of yet another communication method according to an embodiment. As shown in FIG. 10, the communication method includes the following steps.

S701: A second terminal reports a correspondence between a first unicast connection and a third unicast connection to a network device.

In some embodiments, the correspondence between the first unicast connection and the third unicast connection includes an identifier of the first unicast connection and an identifier of the third unicast connection. For example, the second terminal sends data to a first terminal by using a fourth destination identifier DST 4. Optionally, the DST 4 is a destination address of the first terminal device. The DST 4 may be allocated by the first terminal for a third terminal. If a final target terminal of the data sent by the second terminal to the first terminal is the third terminal, in addition to the DST 4, a fifth destination identifier DST 5 further needs to be used. Optionally, the DST 5 is a destination address of the third terminal. The DST 5 may be allocated by the first terminal for the third terminal. Therefore, for the second terminal, the DST 4 may be used to indicate the first unicast connection, and the DST 5 may be used to indicate the third unicast connection. The identifier of the first unicast connection is a destination identifier of the first unicast connection, and the identifier of the third unicast connection is a destination identifier of the third unicast connection. Based on this, the first terminal may simultaneously send the DST 4 and the DST 5 to the network device to report the correspondence between the first unicast connection and the third unicast connection.

Optionally, the second terminal may alternatively use both a source identifier and a destination identifier of a unicast connection as an identifier of the unicast connection. Optionally, the source identifier is a destination identifier of the second terminal. In this case, the identifier of the first unicast connection is a source identifier and a destination identifier of the first unicast connection, and the identifier of the third unicast connection is a source identifier and a destination identifier of the third unicast connection.

It is similar to the embodiment in FIG. 8 that, in some embodiments, in addition to reporting the correspondence between the first unicast connection and the third unicast connection to the network device, the second terminal may further report an identifier of a unicast connection corresponding to QoS information to the network device when reporting the QoS information. Therefore, when a configuration parameter is determined based on the QoS information, it can be ensured that bearer configurations of unicast connections on two sides of the first terminal match.

S702: The network device provides a bearer configuration of the first unicast connection and a bearer configuration of the third unicast connection for the second terminal based on the correspondence between the first unicast connection and the third unicast connection.

The network device may provide the bearer configuration corresponding to the third unicast connection and the bearer configuration corresponding to the first unicast connection for the second terminal based on a correspondence between the first terminal and the third terminal. For example, the network device associates the bearer configuration corresponding to the third unicast connection with the bearer configuration corresponding to the first unicast connection and sends both the bearer configurations to the second terminal.

the second terminal may send the correspondence between the first unicast connection and the third unicast connection to the network device, so that the network device configures the bearer configuration for the second terminal based on the correspondence between the first unicast connection and the third unicast connection. By using this manner, the network device can configure a complete bearer configuration for the second terminal.

An execution body of the communication method shown in FIG. 10 may be replaced with the first terminal or the third terminal. The first terminal may send the correspondence between the first unicast connection and the third unicast connection to the network device, so that the network device configures the bearer configuration for the first terminal based on the correspondence between the first unicast connection and the third unicast connection. Alternatively, the third terminal sends the correspondence between the first unicast connection and the third unicast connection to the network device, so that the network device configures the bearer configuration for the third terminal based on the correspondence between the first unicast connection and the third unicast connection.

Figure 11:
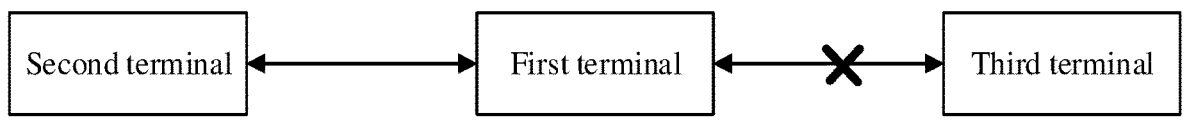
FIG. 11 is a schematic diagram of a scenario of a radio link failure according to an embodiment.
Figure 12:
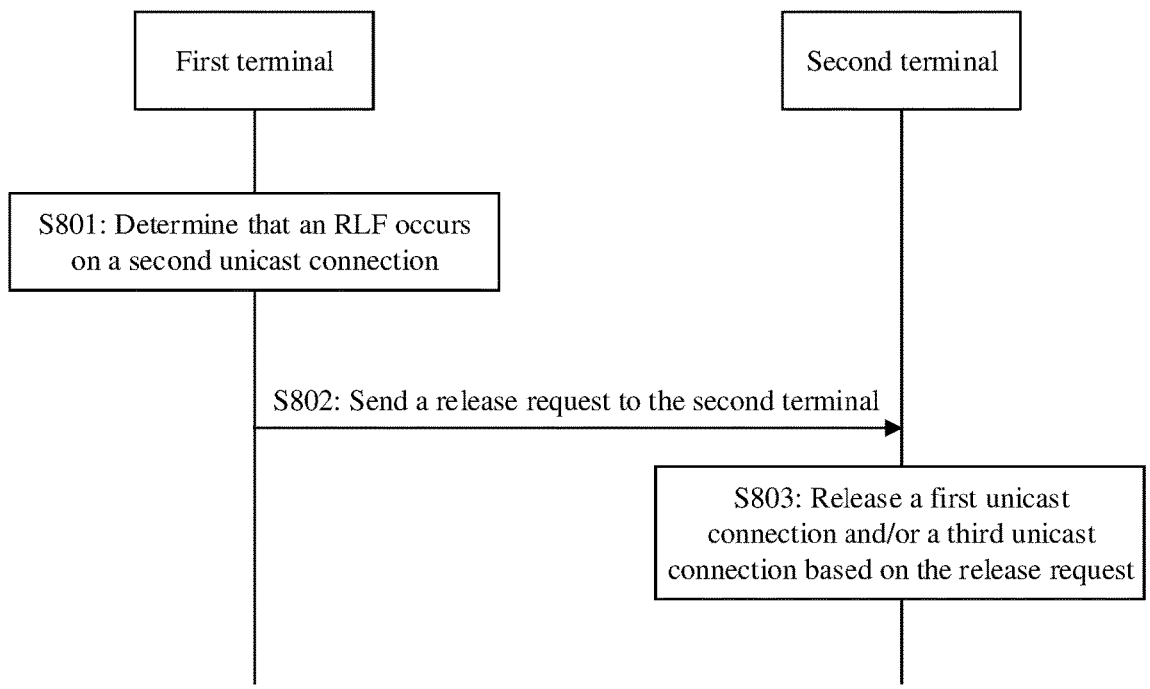
FIG. 12 is a signaling exchange diagram of yet another communication method according to an embodiment.

FIG. 11 is a schematic diagram of a scenario of a radio link failure according to an embodiment. As shown in FIG. 11, after a relay link from a second terminal to a third terminal is completed, when a radio link failure (RLF) occurs on a second unicast connection between the third terminal and a first terminal, if a third unicast connection between the third terminal and the second terminal or a first unicast connection between the first terminal and the second terminal is not released in time, data may be lost. To resolve the foregoing problem, the embodiments may provide a communication method shown in FIG. 12, so that after an RLF occurs on a unicast connection on one side, a unicast connection on the other side and/or an end-to-end unicast connection are/is released in time. FIG. 12 is a signaling exchange diagram of yet another communication method according to an embodiment. As shown in FIG. 12, the communication method includes the following steps.

S801: A first terminal determines that an RLF occurs on a second unicast connection, where the second unicast connection is a unicast connection between a third terminal and the first terminal.

In this embodiment, after the RLF occurs on the second unicast connection, the first terminal identifies, in a timely manner, the second unicast link on which the RLF occurs, and releases the second unicast connection.

S802: The first terminal sends a release request to the second terminal, where the release request requests the second terminal to release a first unicast connection and/or a third unicast connection, the first unicast connection is a unicast connection between the first terminal and the second terminal, and the third unicast connection is a unicast connection between the second terminal and the third terminal.

S803: The second terminal releases the first unicast connection and/or the third unicast connection based on the release request.

It should be understood that the releasing the unicast connection may be releasing an access stratum (AS) configuration, a context, buffered data, or the like related to the unicast connection.

After determining that the RLF occurs on the second unicast connection, the first terminal may send the release request to the second terminal. The second terminal returns acknowledgment information to the first terminal and releases the first unicast connection and/or the third unicast connection.

In some embodiments, the first terminal may send the release request after sending, to the second terminal, data that is received from the third terminal before the RLF occurs on the first unicast connection. Alternatively, for data that is sent by the third terminal to the first terminal before the RLF occurs on the first unicast connection and that needs to be forwarded by the first terminal to the second terminal, if the first terminal has not completed transmission, the first terminal may notify the second terminal of a transmission status. The transmission status indicates at least one of the following content: data that is not successfully delivered to the second terminal, data that is successfully delivered to the second terminal, data that is not transmitted to the second terminal, and data that is transmitted to the second terminal.

In some other embodiments, after the third terminal sends the data to the first terminal, the third terminal may no longer buffer data. In this case, the first terminal may send the data that is not successfully delivered to the second terminal or the data that is not transmitted to the second terminal back to the third terminal, or the first terminal may send first information to the third terminal, where the first information includes a sequence number of the data, indicates the data that is not successfully delivered to the second terminal or the data that is not transmitted to the second terminal.

In some embodiments, if the first unicast connection corresponds only to the second unicast connection, the second terminal may release the first unicast connection. If the first unicast connection not only corresponds to the second unicast connection, but also corresponds to another unicast connection, the second terminal may not release the first unicast connection, but only release the third unicast connection.

In addition, when determining that the RLF occurs on the second unicast connection, the third terminal may release contexts of the first unicast connection and the third unicast connection, and then may trigger a relay terminal reselection procedure. For example, an AS layer of the third terminal sends indication information to an upper layer of the third terminal to trigger relay terminal reselection. For example, the relay terminal reselection may be that the third terminal selects a target relay terminal by using a discovery process and initiates a unicast establishment procedure for the target relay terminal. In another implementation, the relay terminal reselection may alternatively be that the third terminal re-initiates a unicast establishment procedure for the first terminal.

In a possible implementation, the release request includes indication information, and the indication information indicates that an RLF occurs on the second unicast connection.

In the communication method provided in this embodiment, after determining that the RLF occurs on the second unicast connection, the first terminal sends the release request to the second terminal. Then, the second terminal releases the first unicast connection and/or the third unicast connection based on the release request. In this manner, when detecting that the RLF occurs on the second unicast connection, the first terminal may notify the second terminal in time, to quickly release the first unicast connection and/or the third unicast connection corresponding to the second unicast connection, to avoid data loss and improve system efficiency.

Figure 13:
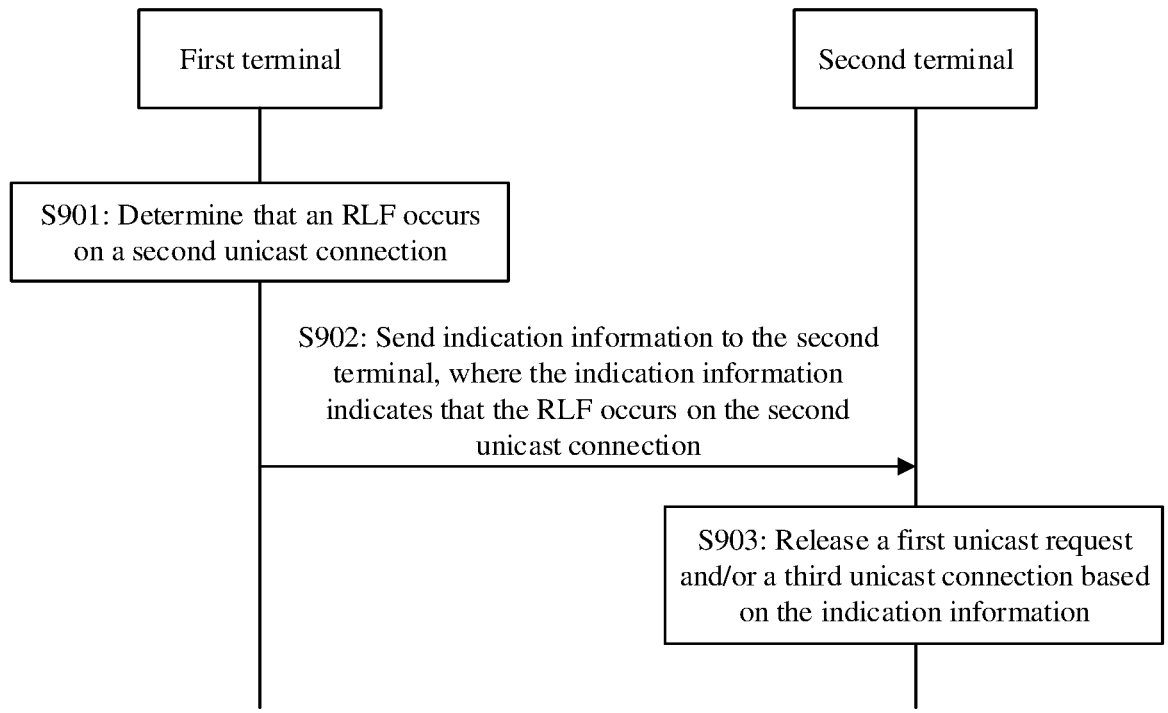
FIG. 13 is a signaling exchange diagram of yet another communication method according to an embodiment.

FIG. 13 is a signaling exchange diagram of yet another communication method according to an embodiment. FIG. 13 relates to another manner of releasing a unicast connection when an RLF occurs. As shown in FIG. 13, the communication method includes the following steps.

S901: A first terminal determines that a radio link failure RLF occurs on a second unicast connection, where the second unicast connection is a unicast connection between a third terminal and the first terminal.

S902: The first terminal sends indication information to a second terminal, where the indication information indicates that the RLF occurs on the second unicast connection.

In the communication method provided in this embodiment, the first terminal determines that the radio link failure RLF occurs on the second unicast connection, and sends the indication information to the second terminal, and the second terminal determines whether to release the first unicast connection and/or the third unicast connection. For a part similar to that in FIG. 12 in this embodiment, details are not described herein again.

Persons of ordinary skill in the art may understand that all or some of the steps of the method embodiments may be implemented by program information related hardware. The program may be stored in a computer-readable storage medium. When the program runs, the steps of the method embodiments are performed. The foregoing storage medium includes various media that can store program code, such as a ROM, a RAM, a magnetic disk, or an optical disc.

Figure 14:
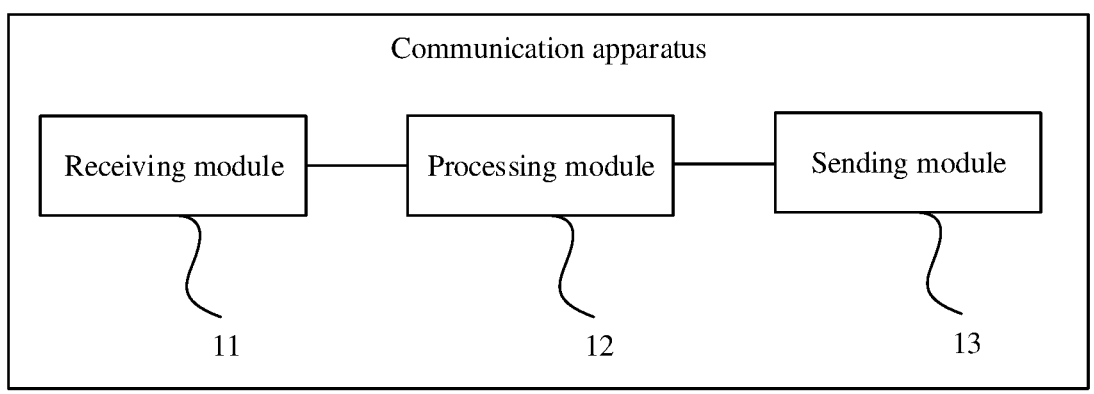
FIG. 14 is a schematic diagram of a structure of a communication apparatus according to an embodiment.

FIG. 14 is a schematic diagram of a structure of a communication apparatus according to an embodiment. The communication apparatus may be implemented by using software, hardware, or a combination thereof, to perform the communication method on a first terminal side. As shown in FIG. 14, the communication apparatus may include a receiving module 11, a processing module 12, and a sending module 13.

The receiving module 11 is configured to receive at least one piece of QoS information from a second terminal.

The processing module 12 is configured to determine first QoS information based on the at least one piece of QoS information.

The processing module 12 is further configured to: determine a first bearer configuration based on the first QoS information, and forward data from the second terminal to a third terminal based on the first bearer configuration.

Alternatively, the apparatus further includes a sending module 13, configured to send the first QoS information to a network device, the receiving module 11 is further configured to receive a first bearer configuration of the network device, and the processing module 12 is further configured to forward data from the second terminal to a third terminal based on the first bearer configuration.

In an optional implementation, the at least one piece of QoS information includes the first QoS information; or the at least one piece of QoS information includes second QoS information and third QoS information, where the second QoS information is QoS information of communication between the second terminal and the third terminal, and the third QoS information is QoS information of communication between the second terminal and the communication apparatus.

In an optional implementation, the at least one piece of QoS information is QoS information of a QoS flow to which the data belongs, or the at least one piece of QoS information is QoS information corresponding to a first bearer.

In an optional implementation, the sending module 13 is further configured to send auxiliary information to the second terminal, where the auxiliary information includes a channel busy ratio CBR measurement result and/or QoS information that can be ensured by the communication apparatus, and the auxiliary information is used to determine the first QoS information.

In an optional implementation, the sending module 13 is further configured to send an identifier of a second unicast connection to the network device, where there is a correspondence between the second unicast connection and the first QoS information, and the second unicast connection is a unicast connection between a first terminal and the third terminal.

In an optional implementation, the sending module 13 is further configured to report a correspondence between a first unicast connection and a second unicast connection to the network device, where the first unicast connection is a unicast connection between the second terminal and the communication apparatus.

In an optional implementation, the correspondence between the first unicast connection and the second unicast connection includes an identifier of the first unicast connection and an identifier of the second unicast connection.

In an optional implementation, the QoS information includes at least one of the following: a rate, a priority, a packet error rate, and a delay.

The communication apparatus provided in this embodiment may perform an action of the communication method on a first terminal side in the foregoing method embodiments. Implementation principles and effects of the communication apparatus are similar to those in the method embodiments, and details are not described herein again.

Figure 15:
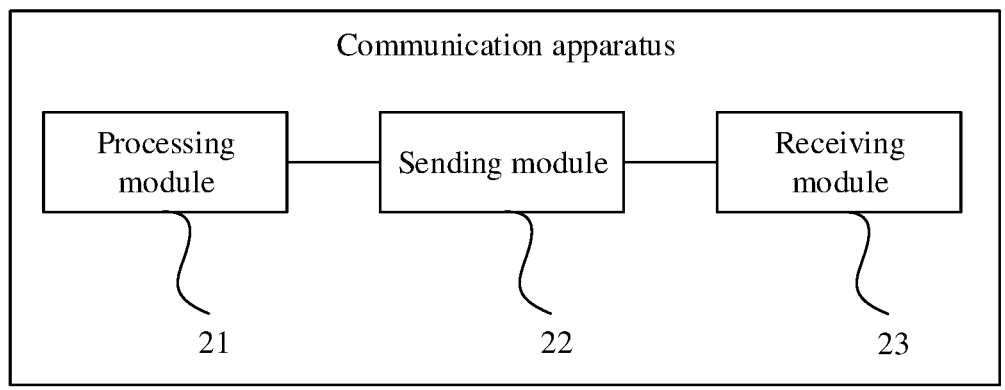
FIG. 15 is a schematic diagram of a structure of another communication apparatus according to an embodiment.

FIG. 15 is a schematic diagram of a structure of another communication apparatus according to an embodiment. The communication apparatus may be implemented by using software, hardware, or a combination thereof, to perform the communication method on a second terminal side. As shown in FIG. 15, the communication apparatus includes a processing module 21, a sending module 22, and a receiving module 23.

The processing module 21 is configured to determine at least one piece of QoS information, where the at least one piece of QoS information is used to determine first QoS information, the first QoS information is used to determine a first bearer configuration, and the first bearer configuration is a bearer configuration required when a first terminal forwards data from the communication apparatus to a third terminal.

The sending module 22 is configured to send the at least one piece of QoS information to the first terminal.

In an optional implementation, the at least one piece of QoS information includes the first QoS information; or the at least one piece of QoS information includes second QoS information and third QoS information.

In an optional implementation, the at least one piece of QoS information is QoS information of a QoS flow to which the data belongs or QoS information corresponding to a first bearer.

In an optional implementation, the sending module 22 is further configured to report the second QoS information to a network device; and the apparatus further includes a receiving module 23, configured to receive the first QoS information sent by the network device.

Alternatively, the processing module 21 determines the first QoS information based on auxiliary information, where the auxiliary information includes a channel busy ratio CBR measurement result and/or QoS information that can be ensured by the first terminal, and the auxiliary information is preconfigured in the communication apparatus or is from the first terminal.

In an optional implementation, the QoS information includes at least one of the following: a rate, a priority, a packet error rate, and a delay.

The communication apparatus provided in this embodiment may perform an action of the communication method on a second terminal side in the foregoing method embodiments. Implementation principles and effects of the communication apparatus are similar to those in the method embodiments, and details are not described herein again.

The embodiments may further provide a communication apparatus. The communication apparatus may be implemented by using software, hardware, or a combination thereof, to perform the communication method on a first terminal side. The communication apparatus includes a sending module.

The sending module is configured to report a correspondence between a first unicast connection and a second unicast connection to a network device, where the first unicast connection is a unicast connection between a second terminal and the first terminal, and the second unicast connection is a unicast connection between the first terminal and a third terminal.

In a possible implementation, the correspondence between the first unicast connection and the second unicast connection includes an identifier of the first unicast connection and an identifier of the second unicast connection.

The communication apparatus provided in this embodiment may perform an action of the communication method on a first terminal side in the foregoing method embodiments. Implementation principles and effects of the communication apparatus are similar to those in the method embodiments, and details are not described herein again.

The embodiments may further provide a communication apparatus. The communication apparatus may be implemented by using software, hardware, or a combination thereof, to perform the communication method on a first terminal side. The communication apparatus includes:

a processing module, configured to determine that a radio link failure RLF occurs on a second unicast connection, where the second unicast connection is a unicast connection between a third terminal and the first terminal; and a sending module, configured to send a release request to the second terminal, where the release request requests the second terminal to release a first unicast connection and/or a third unicast connection, the first unicast connection is a unicast connection between the first terminal and the second terminal, and the third unicast connection is a unicast connection between the second terminal and the third terminal.

In a possible implementation, the release request includes indication information, and the indication information indicates that an RLF occurs on the second unicast connection.

The communication apparatus provided in this embodiment may perform an action of the communication method on a first terminal side in the foregoing method embodiments. Implementation principles and effects of the communication apparatus are similar to those in the method embodiments, and details are not described herein again.

The embodiments may further provide a communication apparatus. The communication apparatus may be implemented by using software, hardware, or a combination thereof, to perform the communication method on a second terminal side. The communication apparatus includes:

a receiving module, configured to receive a release request sent by a first terminal, where the release request requests the second terminal to release a first unicast connection and/or a third unicast connection, the first unicast connection is a unicast connection between the first terminal and the second terminal, and the third unicast connection is a unicast connection between the second terminal and a third terminal; and a processing module, configured to release the first unicast connection and/or the third unicast connection based on the release request, where the release request includes indication information, the indication information indicates that a radio link failure RLF occurs on a second unicast connection, and the second unicast connection is a unicast connection between the third terminal and the first terminal.

In a possible implementation, the processing module may be configured to release the first unicast connection if the first unicast connection corresponds only to the second unicast connection.

The communication apparatus provided in this embodiment may perform an action of the communication method on a second terminal side in the foregoing method embodiments. Implementation principles and effects of the communication apparatus are similar to those in the method embodiments, and details are not described herein again.

The embodiments may further provide a communication apparatus. The communication apparatus may be implemented by using software, hardware, or a combination thereof, to perform the communication method on a first terminal side. The communication apparatus includes:

a processing module, configured to determine that a radio link failure RLF occurs on a second unicast connection, where the second unicast connection is a unicast connection between a third terminal and the first terminal; and a sending module, configured to send indication information to a second terminal, where the indication information indicates that the RLF occurs on the second unicast connection.

The communication apparatus provided in this embodiment may perform an action of the communication method on a first terminal side in the foregoing method embodiments. Implementation principles and effects of the communication apparatus are similar to those in the method embodiments, and details are not described herein again.

The embodiments may further provide a communication apparatus. The communication apparatus may be implemented by using software, hardware, or a combination thereof, to perform the communication method on a second terminal side. The communication apparatus includes:

a receiving module, configured to receive indication information sent by a first terminal, where the indication information indicates that an RLF occurs on a second unicast connection, and the second unicast connection is a unicast connection between a third terminal and the first terminal; and a processing module, configured to release a third unicast connection and/or a first unicast connection based on the indication information, where the third unicast connection is a unicast connection between the second terminal and the third terminal, and the first unicast connection is a unicast connection between the first terminal and the second terminal.

In a possible implementation, the processing module may be configured to release the first unicast connection if the first unicast connection corresponds only to the second unicast connection.

The communication apparatus provided in this embodiment may perform an action of the communication method on a second terminal side in the foregoing method embodiments. Implementation principles and effects of the communication apparatus are similar to those in the method embodiments, and details are not described herein again.

It should be noted that, it should be understood that the receiving module may be a receiver or a communication interface during actual implementation, and the sending module may be a transmitter or a communication interface during actual implementation. The processing module and a positioning management module may be implemented in a form of software invoked by a processing element or may be implemented in a form of hardware. For example, the processing module may be a separately disposed processing element or may be integrated into a chip of the foregoing apparatus for implementation. In addition, the processing module may be stored in a memory of the foregoing apparatus in a form of program code and may be invoked by a processing element of the foregoing apparatus to perform a function of the foregoing processing module. In addition, all or some of these modules may be integrated together or may be implemented independently. The processor element may be an integrated circuit and has a signal processing capability. In an implementation process, steps in the foregoing methods or the foregoing modules may be implemented by using a hardware integrated logical circuit in the processing element, or by using instructions in a form of software.

For example, the foregoing modules may be configured as one or more integrated circuits for performing the foregoing methods, for example, one or more application specific integrated circuits (ASICs), one or more microprocessors (DSPs), or one or more field programmable gate arrays (FPGAs). For another example, when one of the foregoing modules is implemented in a form of program code invoked by a processing element, the processing element may be a general-purpose processor, for example, a central processing unit (CPU) or another processor that can invoke the program code. For another example, these modules may be integrated together and implemented in a form of a system-on-a-chip (SOC).

Figure 16:
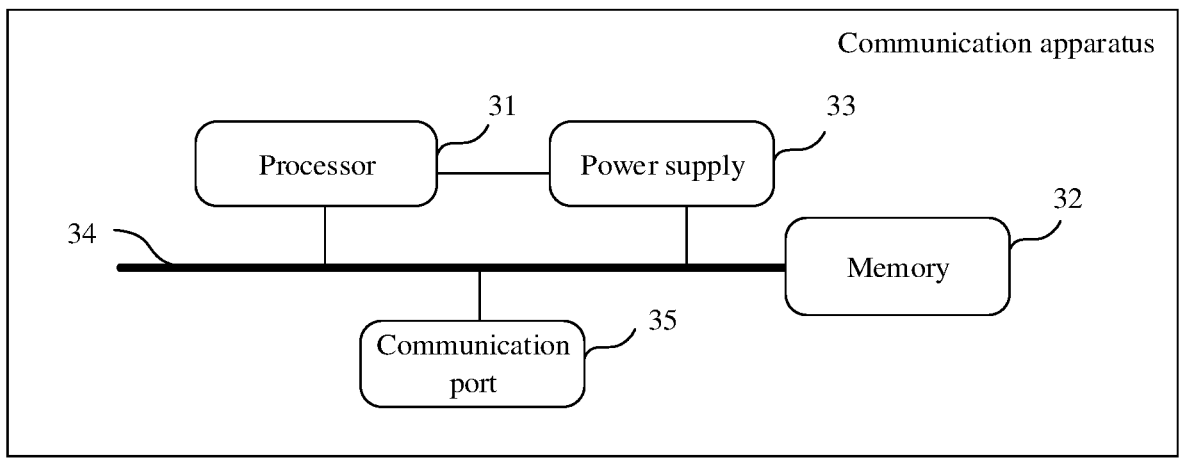
FIG. 16 is a schematic diagram of a structure of still another communication apparatus according to an embodiment.

FIG. 16 is a schematic diagram of a structure of still another communication apparatus according to an embodiment. As shown in FIG. 16, the communication apparatus may include a processor 31 (for example, a CPU) and a memory 32. The memory 32 may include a high-speed random access memory (RAM) and may further include a non-volatile memory (NVM), for example, at least one disk memory. The memory 32 may store various instructions to complete various processing functions and implement the method steps. Optionally, the communication apparatus may further include a power supply 33, a communication bus 34, and a communication port 35. The communication bus 34 is configured to implement communication and connection between elements. The communication port 35 is configured to implement connection and communication between the communication apparatus and other peripherals.

In this embodiment, the memory 32 is configured to store computer-executable program code, and the program code includes instructions. When the processor 31 executes the instructions, the instructions enable the communication apparatus to perform an action of the first terminal in the foregoing method embodiments; or when the processor 31 executes the instructions, the instructions enable the communication apparatus to perform an action of the second terminal in the foregoing method embodiments. Implementation principles and effects thereof are similar, and details are not described herein again.

An embodiment may further provide a chip, including a processor and an interface. The interface is configured to input/output data or instructions processed by the processor. The processor is configured to perform the methods provided in the foregoing method embodiments. The chip may be applied to a first terminal or may be applied to a second terminal.

An embodiment may further provide a non-transitory computer-readable storage medium. The non-transitory computer-readable storage medium may include any medium that can store program code, such as a USB flash drive, a removable hard disk, a read-only memory (ROM), a random access memory (RAM), a magnetic disk, or an optical disc. The non-transitory computer-readable storage medium may store program information. The program information is used to perform the communication method on a first terminal side or the communication method on a second terminal side.

An embodiment may further provide a program. The program is used to perform the communication method on a first terminal side or the communication method on a second terminal side provided in the foregoing method embodiments when being executed by a processor.

An embodiment may further provide a program product, for example, a non-transitory computer-readable storage medium. The program product stores instructions. When the instructions are run on a computer, the computer is enabled to perform the communication method on a first terminal side or the communication method on a second terminal side provided in the foregoing method embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, procedures or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

Finally, it should be noted that the foregoing embodiments are merely intended for describing the embodiments Persons of ordinary skill in the art should understand that they may still make modifications to the foregoing embodiments or make equivalent replacements to some or all features thereof, without departing from the scope of the solutions of the embodiments.

What is claimed is:

1. A communication apparatus, which is a first terminal or included in the first terminal, wherein the communication apparatus comprises a processor, the processor is coupled to a memory configured to store a computer program, and the processor is configured to execute the computer program stored in the memory, to cause the communication apparatus to perform operations comprising:
receiving at least one piece of quality of service (QoS) information from a second terminal;
determining first QoS information based on the at least one piece of QoS information;
determining a first bearer configuration based on the first QoS information, and forwarding data from the second terminal to a third terminal based on the first bearer configuration; or
sending the first QoS information to a network device, receiving a first bearer configuration of the network device, and forwarding data from the second terminal to a third terminal based on the first bearer configuration;
sending an identifier of a second unicast connection to the network device; and
reporting a correspondence between a first unicast connection and a second unicast connection to the network device, wherein said correspondence between the first unicast connection and the second unicast connection ensures that the first bearer configuration matches a second bearer configuration;
wherein the first unicast connection is a unicast connection between the second terminal and the first terminal, and the second unicast connection is a unicast connection between the first terminal and the third terminal, said correspondence indicating a relationship between the first unicast connection and the second unicast connection;
wherein there is a correspondence between the second unicast connection and the first QoS information;
wherein the at least one piece of QoS information is QoS information of a QoS flow to which the data belongs, or the at least one piece of QoS information is QoS information corresponding to a first bearer.

2. The communication apparatus according to claim 1, wherein the at least one piece of QoS information comprises the first QoS information; or the at least one piece of QoS information comprises second QoS information and third QoS information, wherein the second QoS information is QoS information of communication between the second terminal and the third terminal, and the third QoS information is QoS information of communication between the second terminal and the first terminal.

3. The communication apparatus according to claim 1, wherein the operations further comprise:
sending auxiliary information to the second terminal, wherein the auxiliary information comprises a channel busy ratio (CBR) measurement result and/or QoS information that can be ensured by the first terminal, and the auxiliary information is used to determine the first QoS information.

4. The communication apparatus according to claim 1, wherein determining the first bearer configuration comprises receiving the first bearer configuration as a match to a bearer configuration of the second terminal and as a match to a bearer configuration of the third terminal.

5. The communication apparatus according to claim 1, wherein the correspondence between the first unicast connection and the second unicast connection comprises an identifier of the first unicast connection and an identifier of the second unicast connection.

6. The communication apparatus according to claim 1, wherein the QoS information comprises at least one of the following: a rate, a priority, a packet error rate, and a delay.

7. A communication apparatus, which is a second terminal or included in the second terminal, wherein the communication apparatus comprises a processor, the processor is coupled to a memory configured to store a computer program, and the processor is configured to execute the computer program stored in the memory, to cause the communication apparatus to perform operations comprising:
determining at least one piece of quality of service (QoS) information, wherein the at least one piece of QoS information is used to determine first QoS information, the first QoS information is used to determine a first bearer configuration, and the first bearer configuration is a bearer configuration required when a first terminal forwards data from the second terminal to a third terminal;

causing the first terminal to send an identifier of a second unicast connection to the network device; and causing, by sending the at least one piece of QoS information to the first terminal, the first terminal to report a correspondence between a first unicast connection and a second unicast connection to the network device, wherein said correspondence ensures that the first bearer configuration matches a second bearer configuration;

wherein the first unicast connection is a unicast connection between the second terminal and the first terminal, and the second unicast connection is a unicast connection between the first terminal and the third terminal, said correspondence indicating a relationship between the first unicast connection and the second unicast connection;

wherein there is a correspondence between the second unicast connection and the first QoS information; and wherein the at least one piece of QoS information is QoS information of a QoS flow to which the data belongs, or the at least one piece of QoS information is QoS information corresponding to a first bearer.

8. The communication apparatus according to claim 7, wherein the at least one piece of QoS information comprises the first QoS information; or the at least one piece of QoS information comprises second QoS information and third QoS information.

9. The communication apparatus according to claim 8, wherein determining the at least one piece of QoS information further comprises:

reporting the second QoS information and the third QoS information to a network device, and receiving the first QoS information sent by the network device; or determining the first QoS information based on auxiliary information, wherein the auxiliary information comprises a channel busy ratio (CBR) measurement result and/or QoS information that can be ensured by the first terminal, and the auxiliary information is preconfigured in the second terminal or is from the first terminal.

10. The communication apparatus according to claim 7, wherein the QoS information comprises at least one of the following: a rate, a priority, a packet error rate, and a delay.

11. A communication apparatus, which is a network device or included in the network device, wherein the communication apparatus comprises a processor, the processor is coupled to a memory configured to store a computer program, and the processor is configured to execute the computer program stored in the memory, to cause the communication apparatus to perform operations comprising:

receiving second quality of service (QoS) information and third QoS information from a second terminal, and determining first QoS information based on the second QoS information and the third QoS information;

determining a first bearer configuration based on the first QoS information;

sending the first bearer configuration to a first terminal;

wherein the second QoS information is QoS information of communication between the second terminal and a third terminal, the third QoS information is QoS information of communication between the second terminal and the first terminal;

receive an identifier of a second unicast connection, and use the identifier of the second unicast connection to configure a second bearer configuration;

receive, from the first terminal, a correspondence between a first unicast connection and a second unicast connection, and use the correspondence to determine that the first bearer configuration matches the second bearer configuration; and wherein the first unicast connection is a unicast connection between the second terminal and the first terminal, and the second unicast connection is a unicast connection between the first terminal and the third terminal, said correspondence indicating a relationship between the first unicast connection and the second unicast connection;

wherein there is a correspondence between the second unicast connection and the first QoS information; and wherein at least one of the second and third QoS information received from the second terminal is QoS information of a QoS flow to which the data belongs, or the at least one of the second and third QoS information is QoS information corresponding to a first bearer.

12. The communication apparatus according to claim 11, wherein receiving the second QoS information and the third QoS information from the second terminal further comprises:

receiving second QoS information and third QoS information from the second terminal via the first terminal.

13. A communication method, comprising:

with a first terminal or a chip of the first terminal, performing steps of:

receiving at least one piece of quality of service (QoS) information from a second terminal;

determining first QoS information based on the at least one piece of QoS information; and determining a first bearer configuration based on the first QoS information, and forwarding data from the second terminal to a third terminal based on the first bearer configuration; or sending the first QoS information to a network device, receiving a first bearer configuration of the network device;

forwarding data from the second terminal to a third terminal based on the first bearer configuration;

sending an identifier of a second unicast connection to the network device; and reporting a correspondence between a first unicast connection and a second unicast connection to the network device, wherein said correspondence between the first unicast connection and the second unicast connection ensures that the first bearer configuration matches a second bearer configuration;

wherein the first unicast connection is a unicast connection between the second terminal and the first terminal, and the second unicast connection is a unicast connection between the first terminal and the third terminal, said correspondence indicating a relationship between the first unicast connection and the second unicast connection;

wherein there is a correspondence between the second unicast connection and the first QoS information; and wherein the at least one piece of QoS information is QoS information of a QoS flow to which the data belongs, or the at least one piece of QoS information is QoS information corresponding to a first bearer.

14. The communication method according to claim 13, wherein the at least one piece of QoS information comprises the first QoS information; or the at least one piece of QoS information comprises second QoS information and third QoS information, wherein the second QoS information is QoS information of communication between the second terminal and the third terminal, and the third QoS information is QoS information of communication between the second terminal and the first terminal.

15. The communication method according to claim 13, wherein the communication method further comprises:
sending auxiliary information to the second terminal, wherein the auxiliary information comprises a channel busy ratio (CBR) measurement result and/or QoS information that can be ensured by the first terminal, and the auxiliary information is used to determine the first QoS information.

\* \* \* \* \*